(12) United States Patent
Mick et al.

(10) Patent No.: US 10,401,128 B2
(45) Date of Patent: Sep. 3, 2019

(54) SYSTEMS AND METHODS FOR UNDERBODY BLAST STRUCTURE

(71) Applicant: General Dynamics Land Systems, Sterling Heights, MI (US)

(72) Inventors: Kenneth Mick, Washington, MI (US); Scott W. Hall, Davisburg, MI (US); Thomas J. Zeleznik, Rochester Hills, MI (US); Kenneth W. Kendall, Almont, MI (US); Eric C. Marshall, Macomb, MI (US); James M. Eridon, Shelby Township, MI (US); Alexandre Y. Boglaev, Oxford, MI (US); Stephen M. Beesley, Troy, MI (US); Aeraj A. Ibraheem, Shelby Township, MI (US)

(73) Assignee: General Dynamics Land Systems, Sterling Heights, MI (US)

( * ) Notice: Subject to any disclaimer, the term of this patent is extended or adjusted under 35 U.S.C. 154(b) by 33 days.

(21) Appl. No.: 15/707,879

(22) Filed: Sep. 18, 2017

(65) Prior Publication Data

US 2018/0080743 A1 Mar. 22, 2018

Related U.S. Application Data

(60) Provisional application No. 62/396,626, filed on Sep. 19, 2016.

(51) Int. Cl.
*F41H 7/04* (2006.01)
*F41H 5/16* (2006.01)
(Continued)

(52) U.S. Cl.
CPC .............. *F41H 7/042* (2013.01); *B62D 25/20* (2013.01); *F41H 5/013* (2013.01); *F41H 5/16* (2013.01)

(58) Field of Classification Search
CPC . F41H 7/042; F41H 5/013; F41H 5/16; F41H 5/04; B62D 55/32; B62D 25/20; B62D 21/15
(Continued)

(56) References Cited

U.S. PATENT DOCUMENTS 4,326,445 A * 4/1982 Bemiss ................. B60K 15/00
296/187.07
5,822,836 A 10/1998 Riddle
(Continued)

FOREIGN PATENT DOCUMENTS

EP 0963903 A2 * 12/1999 ............. B62D 55/00

*Primary Examiner* — James A Shriver, II
*Assistant Examiner* — Steve Clemmons
(74) *Attorney, Agent, or Firm* — LKGlobal + Lorenz & Kopf, LLP

(57) ABSTRACT

Systems and methods are provided for an underbody blast structure. The underbody blast structure includes at least one hanger to couple to a vehicle. The underbody blast structure also includes a housing coupled to the at least one hanger. The housing includes a first protection plate opposite a second protection plate. The first protection plate and the second protection plate are to protect the vehicle. The first protection plate is spaced apart from the second protection plate by a plurality of interconnecting members. The plurality of interconnecting members defines a plurality of channels between the first protection plate and the second protection plate. At least one of the plurality of channels is adapted to receive a portion of a suspension system of the vehicle.

19 Claims, 24 Drawing Sheets

(51) Int. Cl.
  *F41H 5/013* (2006.01)
  *B62D 25/20* (2006.01)

(58) Field of Classification Search
  USPC ...... 296/193.017, 25, 187.07, 187.08; 280/2, 280/770
  See application file for complete search history.

(56) References Cited

U.S. PATENT DOCUMENTS

| | | | |
|---|---|---|---|
| 6,658,984 B2* | 12/2003 | Zonak | F41H 7/042 296/193.07 |
| 7,025,429 B2* | 4/2006 | Yoshida | B62D 55/1086 180/9.54 |
| 7,255,034 B2 | 8/2007 | Strassgurtl et al. | |
| 8,033,208 B2* | 10/2011 | Joynt | F41H 7/042 296/187.07 |
| 8,863,884 B2* | 10/2014 | Jacob-Lloyd | B60G 11/181 180/299 |
| 8,960,068 B2* | 2/2015 | Jacquemont | F41H 7/042 296/187.07 |
| 8,998,299 B2* | 4/2015 | Shmargad | F41H 7/042 296/187.07 |
| 9,383,175 B2* | 7/2016 | Walter | F41H 7/042 |
| 9,440,523 B2* | 9/2016 | Decker | H01M 2/0237 |
| 2008/0066613 A1* | 3/2008 | Mills | F41H 7/042 89/36.09 |
| 2010/0170386 A1* | 7/2010 | Bhatnagar | F41H 5/023 89/36.02 |
| 2011/0017054 A1* | 1/2011 | Naroditsky | F41H 7/042 89/36.02 |
| 2011/0168001 A1* | 7/2011 | Lee | F41H 7/042 89/36.02 |
| 2012/0049570 A1* | 3/2012 | Aizik | F41H 7/042 296/187.08 |
| 2012/0103177 A1* | 5/2012 | Coltrane | B60F 3/0038 89/36.02 |
| 2013/0249244 A1* | 9/2013 | Cassaday | B62D 25/2036 296/187.08 |
| 2016/0265646 A1* | 9/2016 | Kwiatkowski | F16H 57/037 |
| 2017/0321995 A1* | 11/2017 | Sumi | F41H 7/042 |

\* cited by examiner

(12) United States Patent

SYSTEMS AND METHODS FOR UNDERBODY BLAST STRUCTURE

CROSS-REFERENCE TO RELATED APPLICATION

This application claims the benefit of U.S. Provisional Application No. 62/396,626, filed on Sep. 19, 2016, which is incorporated herein by reference.

TECHNICAL FIELD

The present disclosure generally relates to vehicles, and more particularly relates to systems and methods for an underbody blast structure for a motor vehicle.

BACKGROUND

Motor vehicles can be employed in a variety of operating environments. Certain motor vehicles serve as combat vehicles, and operate in combat environments. Given the nature of combat environments, these motor vehicles may be exposed to certain hazards, such as explosive devices, designed to impede the operation of the motor vehicle. Further, given advances in technologies, certain legacy motor vehicles may need to be provided with additional protection against hazards in the combat environment.

Accordingly, it is desirable to provide systems and methods for an underbody blast structure for a motor vehicle, which provides additional protection against hazards, such as explosive devices. In addition, it is desirable to provide systems and methods for an underbody blast structure that may be retrofit to legacy motor vehicles to protect against hazards, such as explosive devices. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an underbody blast structure. The underbody blast structure includes at least one hanger adapted to couple to a vehicle. The underbody blast structure also includes a housing coupled to the at least one hanger. The housing includes a first protection plate opposite a second protection plate. The first protection plate and the second protection plate are adapted to protect the vehicle. The first protection plate is spaced apart from the second protection plate by a plurality of interconnecting members. The plurality of interconnecting members defines a plurality of channels between the first protection plate and the second protection plate. At least one of the plurality of channels is adapted to receive a portion of a suspension system of the vehicle.

Further provided according to various embodiments is a kit for coupling to a vehicle to provide underbody blast protection. The kit includes a housing. The housing including a first protection plate opposite a second protection plate. The first protection plate is spaced apart from the second protection plate by a plurality of interconnecting members. The plurality of interconnecting members defines a plurality of channels between the first protection plate and the second protection plate. At least one of the plurality of channels is adapted to receive a portion of a suspension system of the vehicle. The kit includes at least one hanger coupled to the first protection plate and the at least one hanger couples the housing to the vehicle.

Also provided according to various embodiments is a vehicle. The vehicle includes a body defining a first plurality of body mounting interfaces on a first side and a second plurality of body mounting interfaces on a second side. The body has an underbody between the first side and the second side. The vehicle includes a suspension system coupled to a plurality of road wheels, and an underbody blast structure coupled adjacent to the underbody the vehicle. The underbody blast structure includes a first hanger having a first plurality of coupling interfaces that cooperate with the first plurality of body mounting interfaces to couple the first hanger to the first side of the body. The underbody blast structure has a second hanger having a second plurality of coupling interfaces that cooperate with the second plurality of body mounting interfaces to couple the second hanger to the second side of the body. The underbody blast structure includes a housing coupled to the first hanger and the second hanger. The housing includes a first protection plate opposite a second protection plate. The housing includes a first plurality of abutments that extend from the housing along a first housing side of the housing and a second plurality of abutments that extend from the housing along a second housing side of the housing. The first protection plate is spaced apart from the second protection plate by a plurality of interconnecting members. The plurality of interconnecting members defines a plurality of channels between the first protection plate and the second protection plate that extend from the first housing side to the second housing side. At least one of the plurality of channels is in communication with a respective one of the first plurality of abutments and a respective one of the second plurality of abutments to receive a portion of the suspension system, with each of the first plurality of abutments and each of the second plurality of abutments coupled to a respective one of the plurality of road wheels.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle that would benefit from an underbody blast structure, and that the track motor vehicle described herein is merely one exemplary embodiment according to the present disclosure. Moreover, while the underbody blast structure is described herein as being used with a track motor vehicle, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
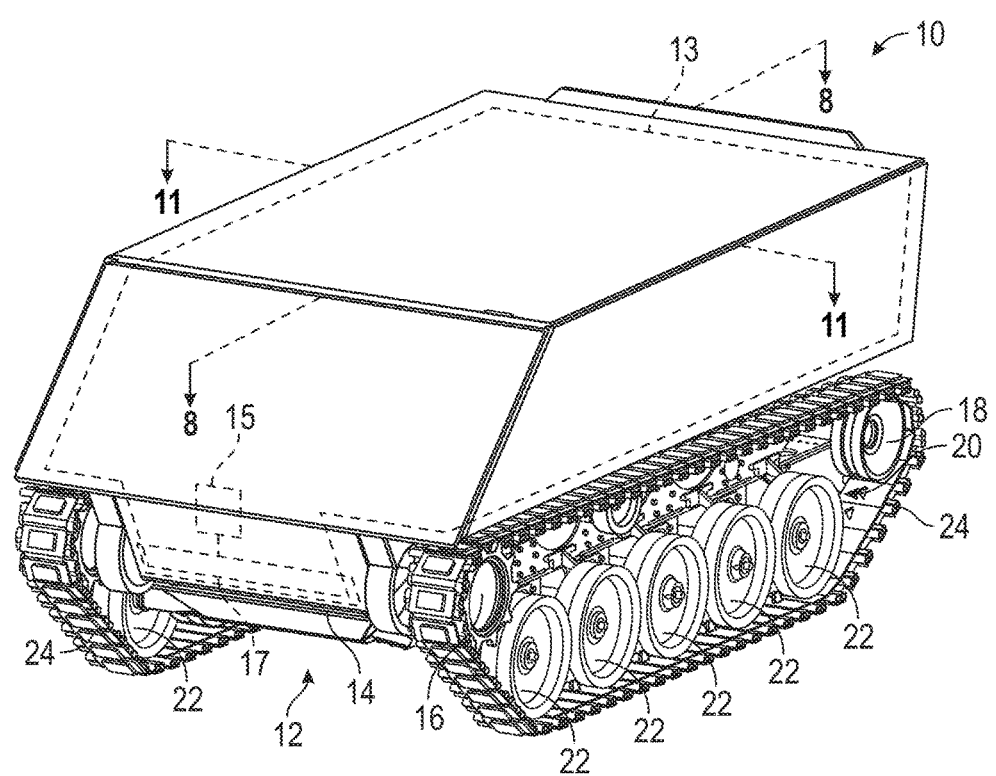
FIG. 1 is a perspective view of a motor vehicle including a non-limiting embodiment of an underbody blast structure in accordance with the various teachings of the present disclosure.

With reference to FIG. 1, an exemplary vehicle 10 having an underbody blast structure 12 is shown. In this example, the vehicle 10 is a continuous track combat vehicle, such as a tank. It should be noted, however, that the vehicle 10 can be any suitable vehicle, such as a recovery vehicle, armored car, troop carrier, amphibious vehicle, rocket launching tank, tank destroyer, mortar carrier, air defense vehicle, combat engineer section carriers, and so on. Moreover, it will be understood that the vehicle 10 need not be an operator driven vehicle. Rather, the vehicle 10 may be an autonomous vehicle, unmanned ground vehicle, self-propelled vehicle, etc. Further, the vehicle 10 need not comprise a track vehicle. Rather, the vehicle 10 may comprise one or more driven wheels and tires. Thus, the vehicle 10 as a track combat vehicle is merely an example. As will be discussed, the underbody blast structure 12 provides additional protection to an underbody 14 of the vehicle 10, by absorbing energy generated during an explosion of an explosive device, such as a mine. The additional energy absorption provided by the underbody blast structure 12 improves the survivability against an explosion. Moreover, the underbody blast structure 12 increases a volume of a cabin 13 of the vehicle 10 without impacting a ground clearance of the vehicle 10, which facilitates the installation of additional explosion mitigation devices within the vehicle 10.

In this example, the vehicle 10 includes a propulsion system 15 that supplies torque to a driveline 17 to drive a first, front pair of driving wheels 16. In one example, the propulsion system 15 is a Full Up Power Pack (FUPP). The FUPP includes the propulsion system (engine and transmission), and associated cooling system. The vehicle 10 also includes a second, rear pair of idler wheels 18. It should be noted, however, that the vehicle 10 may also include a rear pair of driving wheels, or that the front pair of wheels may comprise idler wheels and the rear pair of wheels may comprise driving wheels, if desired. The vehicle 10 further includes a suspension system 20, which supports a plurality of road wheels 22, and a pair of continuous tracks 24. The underbody blast structure 12 is coupled to the vehicle 10 such that at least the suspension system 20, including the plurality of road wheels 22, is coupled to the underbody blast structure 12. By coupling the suspension system 20 to the underbody blast structure 12, the volume of the cabin 13 of the vehicle 10 is increased, as a lowest floor point opposite the underbody 14 is now usable as interior space, instead of being occupied by the suspension system 20.

Figure 2:
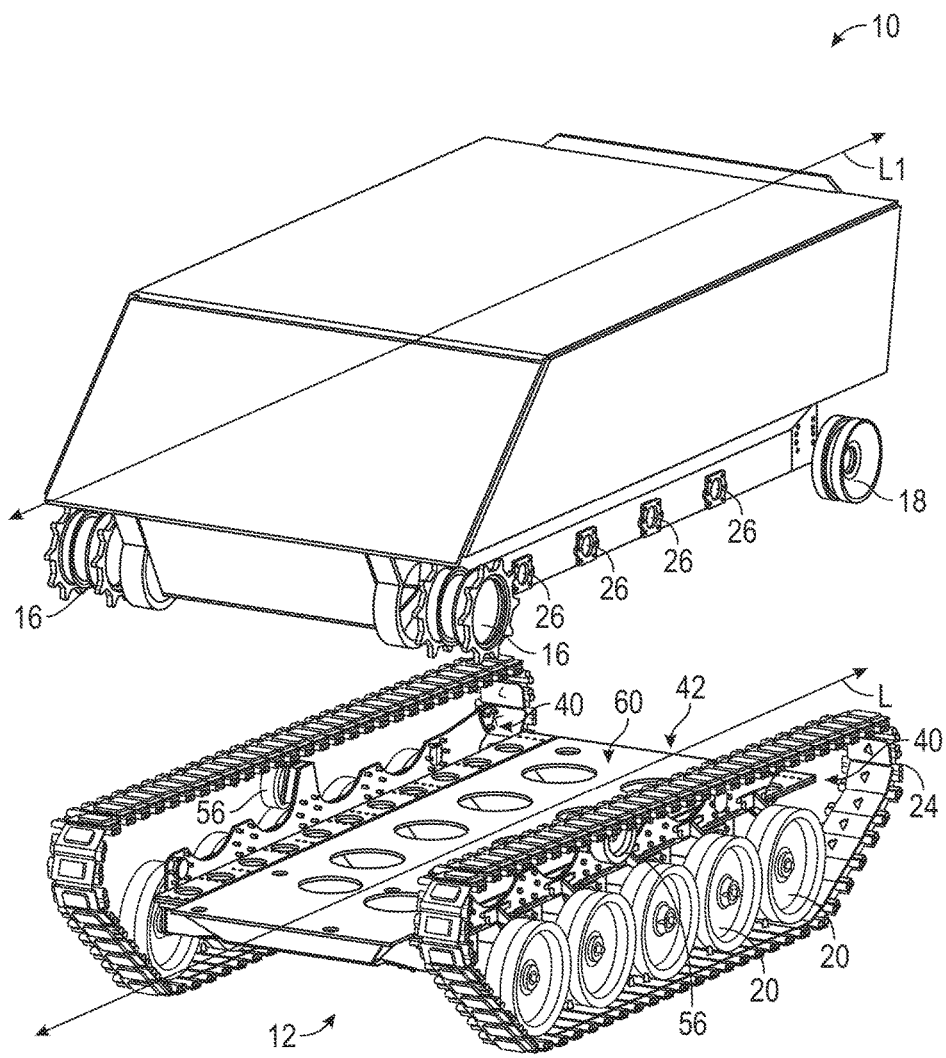
FIG. 2 is a partially exploded view of the vehicle of FIG. 1.

With reference to FIG. 2, the underbody blast structure 12 is shown exploded from the vehicle 10. In this example, the underbody blast structure 12 is coupled to the suspension system 20, the plurality of road wheels 22 and the pair of continuous tracks 24, and is not coupled to the front pair of wheels 16 (which are the driving wheels) or the rear pair of wheels 18 (which are the idler wheels). It will be understood, however, that while the underbody blast structure 12 is illustrated and described herein as not being coupled to the wheels 16, 18, in other embodiments, one or more of the wheels 16, 18 may be coupled to the underbody blast structure 12. Moreover, other systems associated with the vehicle 10, such as an engine, transmission, steering system, etc. may be coupled to the underbody blast structure 12, if desired.

The vehicle 10 also includes a plurality of mounting interfaces 26 spaced apart along a longitudinal axis L1 of the vehicle 10. In this example, the plurality of mounting interfaces 26 are a plurality of mounting flanges, however, the mounting interfaces 26 need not include a flange. Typically, the plurality of mounting interfaces 26 couple the suspension system 20 to the vehicle 10, however, in the example of the vehicle 10 being coupled to the underbody blast structure 12, the plurality of mounting interfaces 26 couple the underbody blast structure 12 to the vehicle 10. Thus, in legacy vehicles, the underbody blast structure 12 is capable of being coupled to current mounting interfaces, such as the plurality of mounting interfaces 26, without requiring a modification of the vehicle 10. This enables the underbody blast structure 12 to be retrofit to a legacy vehicle, such as the vehicle 10.

Figure 3:
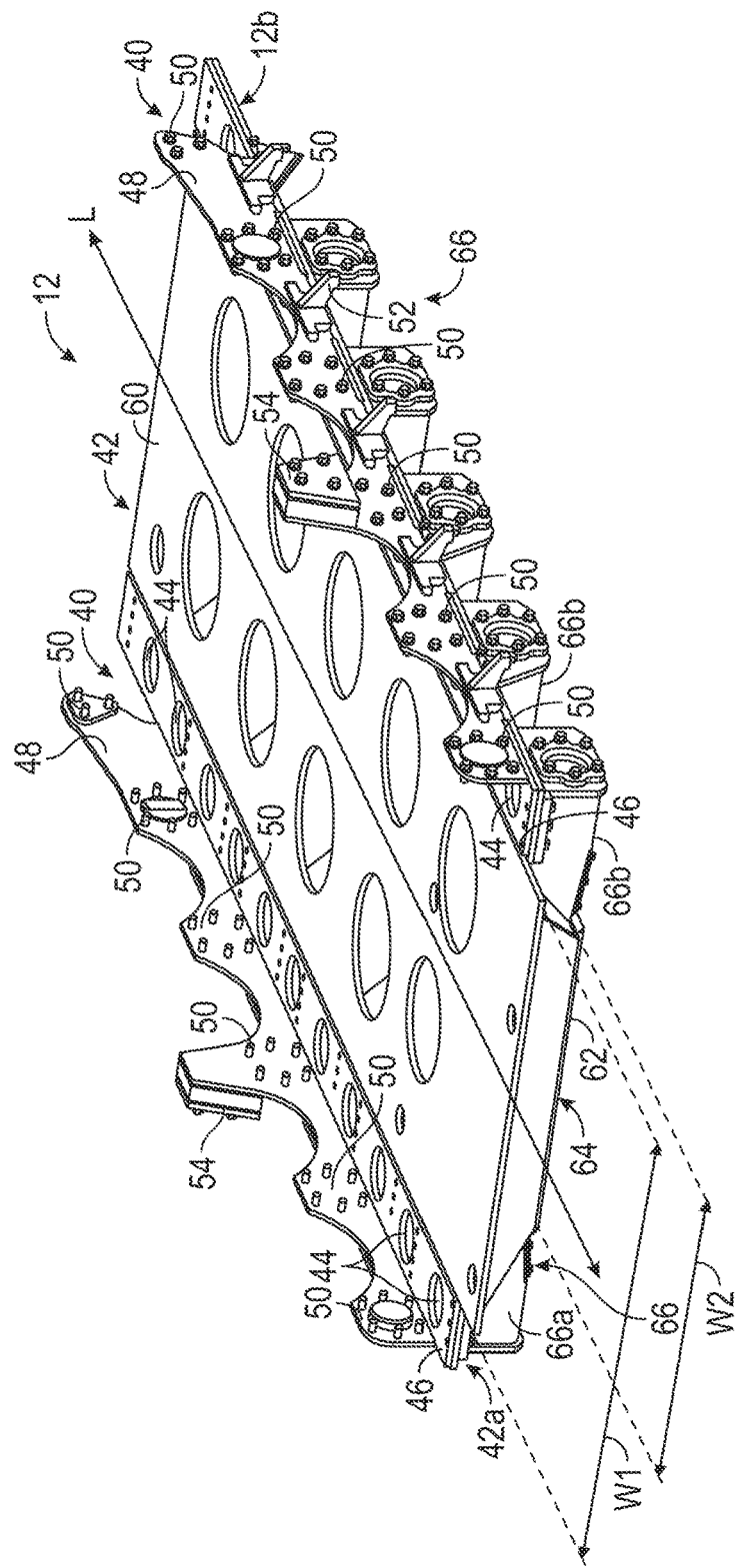
FIG. 3 is a top perspective view of the underbody blast structure of FIG. 1.

The underbody blast structure 12 includes a pair of hangers 40 (i.e. a first hanger 40 and a second hanger 40) and a housing 42. The hangers 40 and the housing 42 may be composed of a metal, metal alloy or composite material. In the example of a metal or metal alloy, the hangers 40 and the housing 42 may be stamped, cast, machined, forged, selective laser sintered, etc. With reference to FIG. 3, a top perspective view of the hangers 40 and the housing 42 are shown. Each of the hangers 40 is coupled to the housing 42 so as to be spaced apart along the housing 42 a distance substantially equal to a width of the vehicle 10, such that the vehicle 10 may be received between the hangers 40. In this example, a first one of the hangers 40 is coupled to a first side 42a of the housing 42, and a second one of the hangers 40 is coupled to a second, opposite side 42b of the housing 42. Generally, the hangers 40 are coupled to the housing 42 via one or more mechanical fasteners, such as bolts, however, the hangers 40 may be coupled to the housing 42 via welding, adhesives, rivets, etc. As each of the hangers 40 is substantially the same, but symmetric about a longitudinal axis L of the underbody blast structure 12, for ease of description, a single hanger 40 will be discussed in detail herein.

Figure 4:
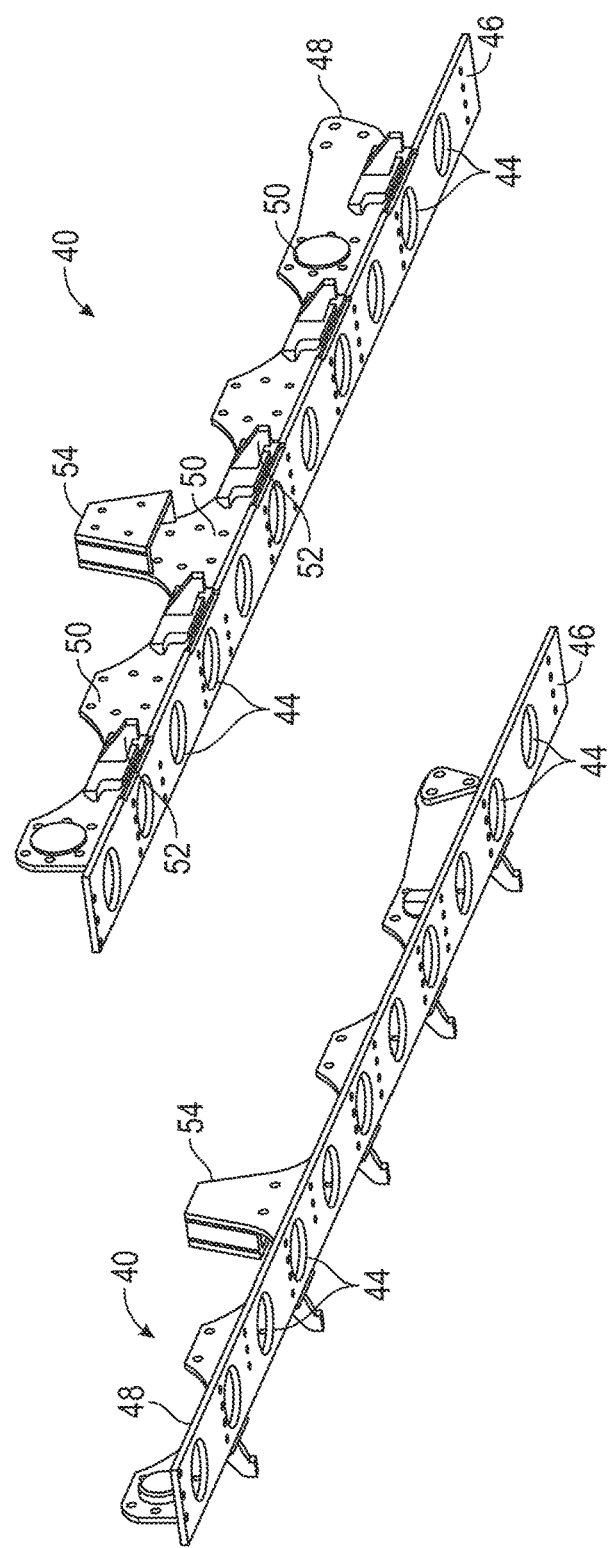
FIG. 4 is a front perspective view of a non-limiting embodiment of an underside of a pair of hangers of the underbody blast structure of FIG. 1.
Figure 5:
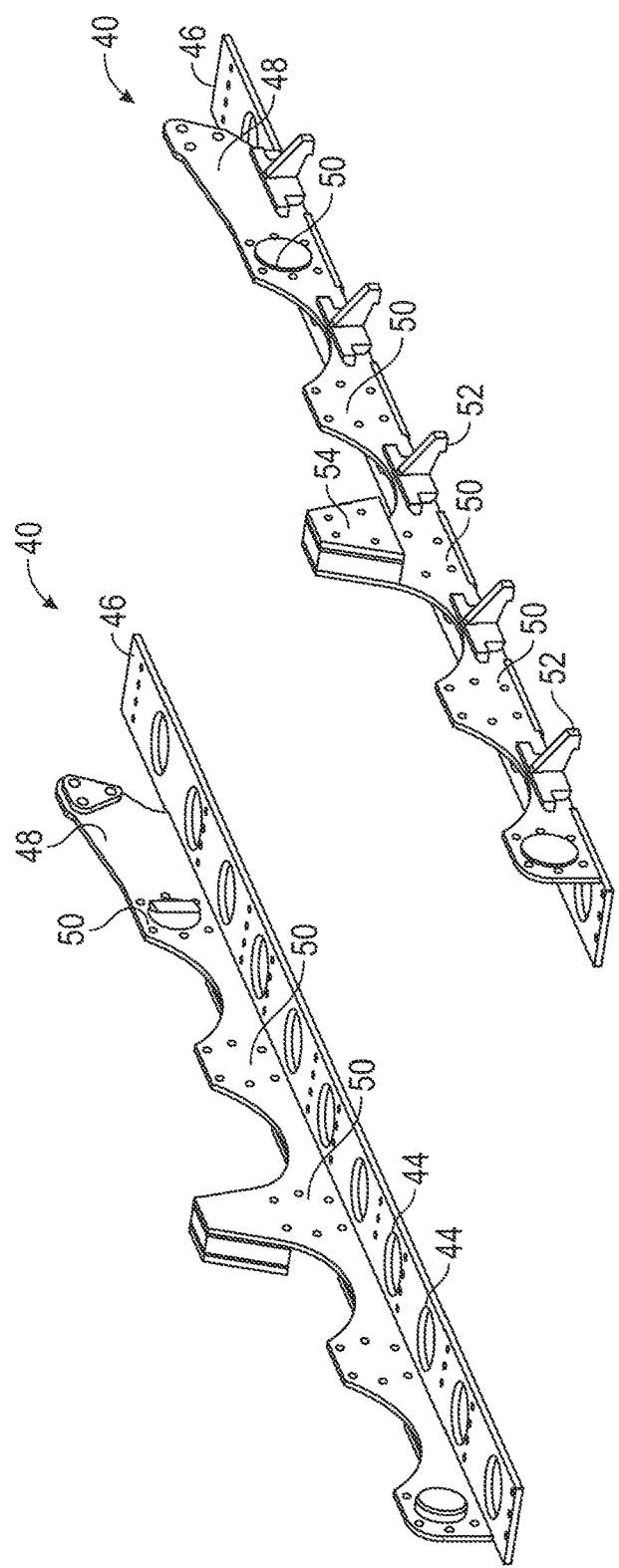
FIG. 5 is a front perspective view of the pair of hangers of FIG. 4.

With reference to FIGS. 4 and 5, the hanger 40 is substantially L-shaped, and includes a plurality of bores 44 defined through a first side 46. The plurality of bores 44 receive the mechanical fasteners to couple the hanger 40 to the housing 42. The plurality of bores 44 can be spaced apart along the first side 46 of the hanger 40 in the direction of the longitudinal axis L (FIG. 3). It should be understood that the hanger 40 may include any number of bores 44, and that the number of bores 44 illustrated herein is merely exemplary. The hanger 40 includes a second side 48, which is substantially perpendicular to the first side 46. The second side 48 includes a plurality of coupling interfaces 50, at least one travel stop 52 and at least one return mount 54.

The plurality of coupling interfaces 50 are configured to mate with the plurality of mounting interfaces 26 of the vehicle 10. Generally, each one of the plurality of coupling interfaces 50 is configured to mate with a respective one of the plurality of mounting interfaces 26 to couple the underbody blast structure 12 to the vehicle 10. Thus, it should be understood that different vehicles 10 may have different mounting interfaces 26, and that the coupling interfaces 50 of the underbody blast structure 12 may be configured differently to mate with or correspond with those mounting interfaces. In this example, each of the plurality of coupling interfaces 50 comprise a plurality of spaced apart through bores that are sized to receive a plurality of mechanical fasteners, such as bolts, in a predefined pattern that corresponds with the respective one of the plurality of mounting interfaces 26 to mechanically fasten the underbody blast structure 12 to the vehicle 10. In this example, each of the plurality of coupling interfaces 50 are spaced apart along the longitudinal axis L (FIG. 3) of the underbody blast structure 12. It should be noted that in other embodiments, the hanger 40 may be welded to the vehicle 10, if desired. Thus, the hangers 40 generally couple the housing 42 of the underbody blast structure 12 to the vehicle 10.

The at least one travel stop 52 limits the amount of vertical displacement of a respective one of the plurality of road wheels 22 (FIG. 2). The at least one return mount 54 couples a return roller 56 (FIG. 2) to the underbody blast structure 12. In this example, the return mount 54 includes a plurality of bores that receive threaded mechanical fasteners, such as bolts, to couple the return roller 56 to the hanger 40. The return roller 56 aids in the return of the continuous track 24 to the respective wheel 16, 18. It should be noted that while a single return mount 54 is shown for a single return roller 56 (FIG. 2), any number of return mounts and rollers may be employed with the vehicle 10.

Figure 6:
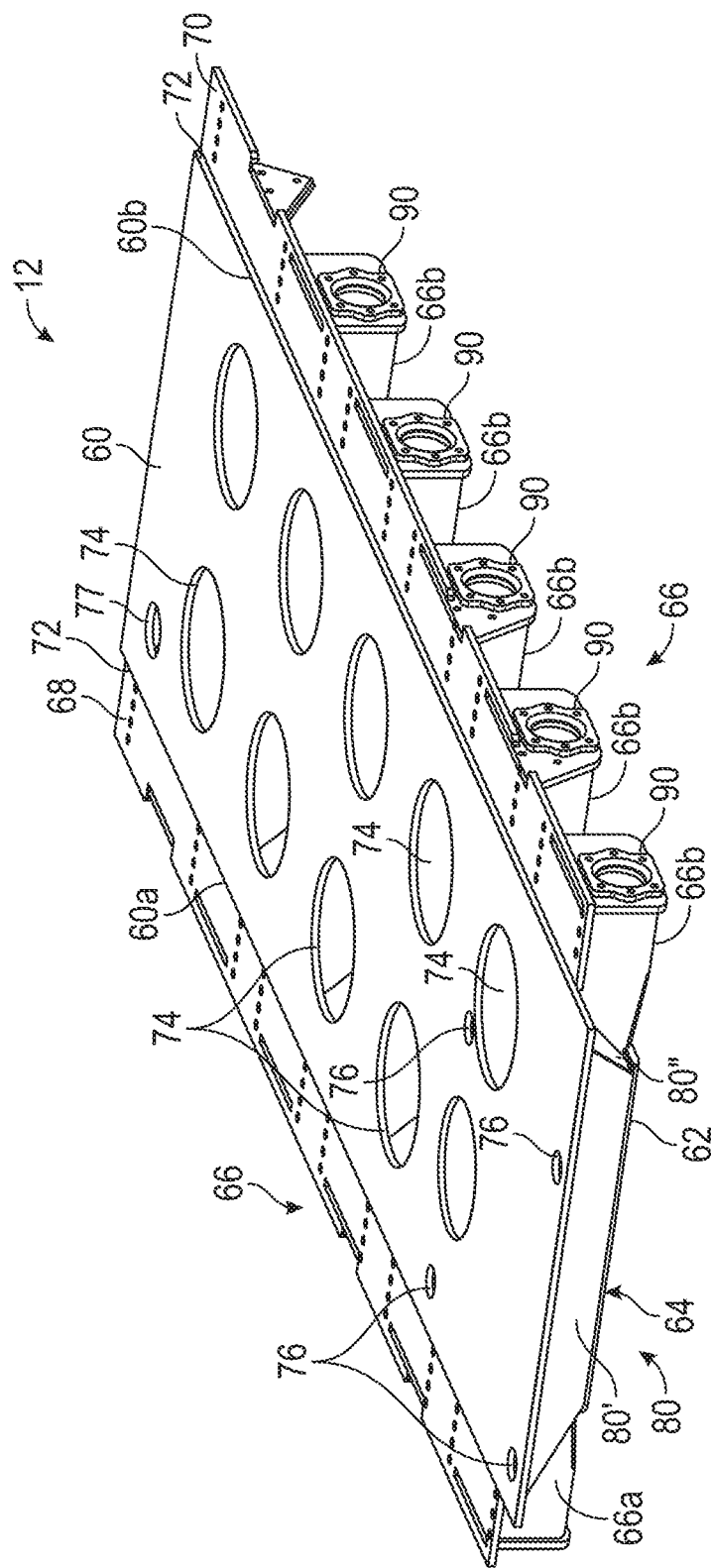
FIG. 6 is a top perspective view of a non-limiting embodiment of a housing of the underbody blast structure of FIG. 1.

With reference back to FIG. 3, the housing 42 protects the underbody 14 (FIG. 1) of the vehicle 10. In this example, the housing 42 includes a first, top protection plate 60, a second, bottom or belly protection plate 62, a plurality of interconnecting members 64, and a plurality of abutments 66. In one example, the plurality of abutments 66 includes a first plurality of abutments 66a and a second plurality of abutments 66b. With reference now to FIG. 6, a top perspective view of the housing 42 is shown. The top protection plate 60 extends along the longitudinal axis L (FIG. 3), and can have a width W1 that is greater than a width W2 of the belly protection plate 62 such that the top protection plate 60 and the belly protection plate 62 cooperate to form a truncated V-shape. The truncated V-shape formed by the top protection plate 60 and the belly protection plate 62 increases the absorption of energy during an explosion of an explosive device. The top protection plate 60 is opposite the belly protection plate 62, and each of the top protection plate 60 and the belly protection plate 62 protect the vehicle 10 from an impact or explosion event.

In this example, the top protection plate 60 includes a first lip plate 68 and a second lip plate 70. The top protection plate 60 is coupled to the first lip plate 68 and the second lip plate 70. The top protection plate 60 may be coupled to the first lip plate 68 and the second lip plate 70 via welding, adhesives, mechanical fasteners, etc. The first lip plate 68 extends along the first plurality of abutments 66a that extend outwardly adjacent to a first side 62a of the belly protection plate 62, and the second lip plate 70 extends along the second plurality of abutments 66b that extend outwardly adjacent to a second side 62b of the belly protection plate 62. In this example, the first lip plate 68 is coupled to a first side 60a of the top protection plate 60, and the second lip plate 70 is coupled to a second, opposite side 60b of the top protection plate 60. The top protection plate 60 is coupled to the first lip plate 68 and the second lip plate 70 to define a respective ledge 72 for receipt of a respective one of the hangers 40. Thus, the first side 46 of the first one of the hangers 40 (FIG. 5) is coupled to the first lip plate 68 on the first side 60a of the top protection plate 60; and the first side 46 of the second one of the hangers 40 (FIG. 5) is coupled to the second lip plate 70 on the second side 60b of the top protection plate 60. The ledges 72 are generally defined to have a thickness substantially equal to a thickness of the second side 48 of the hangers 40 to provide a uniform surface for receiving the underbody 14 of the vehicle 10. It should be noted, however, that the hangers 40 may be coupled directly to the respective first and second plurality of abutments 66a, 66b, if desired. In this example, the hangers 40 are coupled to the first lip plate 68 and the second lip plate 70 via a plurality of mechanical fasteners, however, any suitable technique may be used, such as adhesives, welding, etc.

In this example, the top protection plate 60 defines a plurality of apertures 74. The plurality of apertures 74 are spaced apart along a surface of the top protection plate 60 to provide for a reduction in weight of the top protection plate 60, while maintaining the structural rigidity of the top protection plate 60. It should be noted that the top protection plate 60 need not be formed with a plurality of apertures 74, if desired. Moreover, it will be understood that there are alternative methods to reduce a weight of the top protection plate 60, and further, that depending upon the vehicle 10, the top protection plate 60 may be optional. The top protection plate 60 is adjacent to the underbody 14 (FIG. 1) of the vehicle 10 when the underbody blast structure 12 is coupled to the vehicle 10. Generally, the underbody blast structure 12 is coupled such that the top protection plate 60 is spaced a distance apart from the underbody 14 (FIG. 1), however, the top protection plate 60 may contact the underbody 14, if desired.

The top protection plate 60 may also define a plurality of clearance holes 76 and at least one drain hole 77. Each of the plurality of clearance holes 76 provides clearance for the coupling of the underbody blast structure 12 to the propulsion system 15, such as the FUPP, associated with the vehicle 10. The at least one drain hole 77 enables fluids to drain from the vehicle 10 through the underbody blast structure 12.

Figure 7:
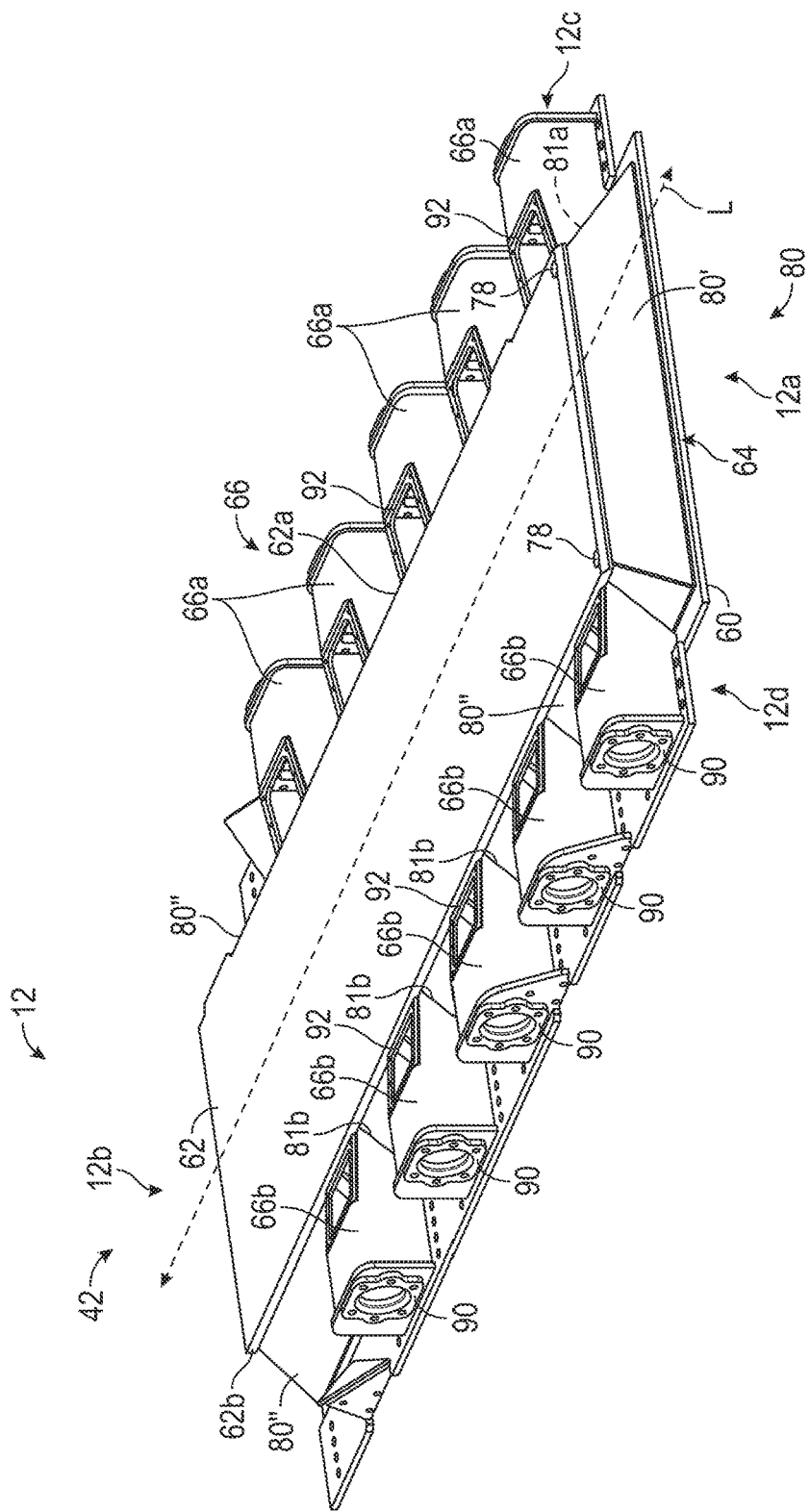
FIG. 7 is a front perspective view of an underside of the housing of FIG. 6.

With reference to FIG. 7, FIG. 7 is a rear perspective view of the housing 42, which illustrates the belly protection plate 62. The belly protection plate 62 is substantially planar, and includes one or more underbody drain holes 78. The underbody drain holes 78 enable fluids to drain from the underbody blast structure 12.

Figure 8:
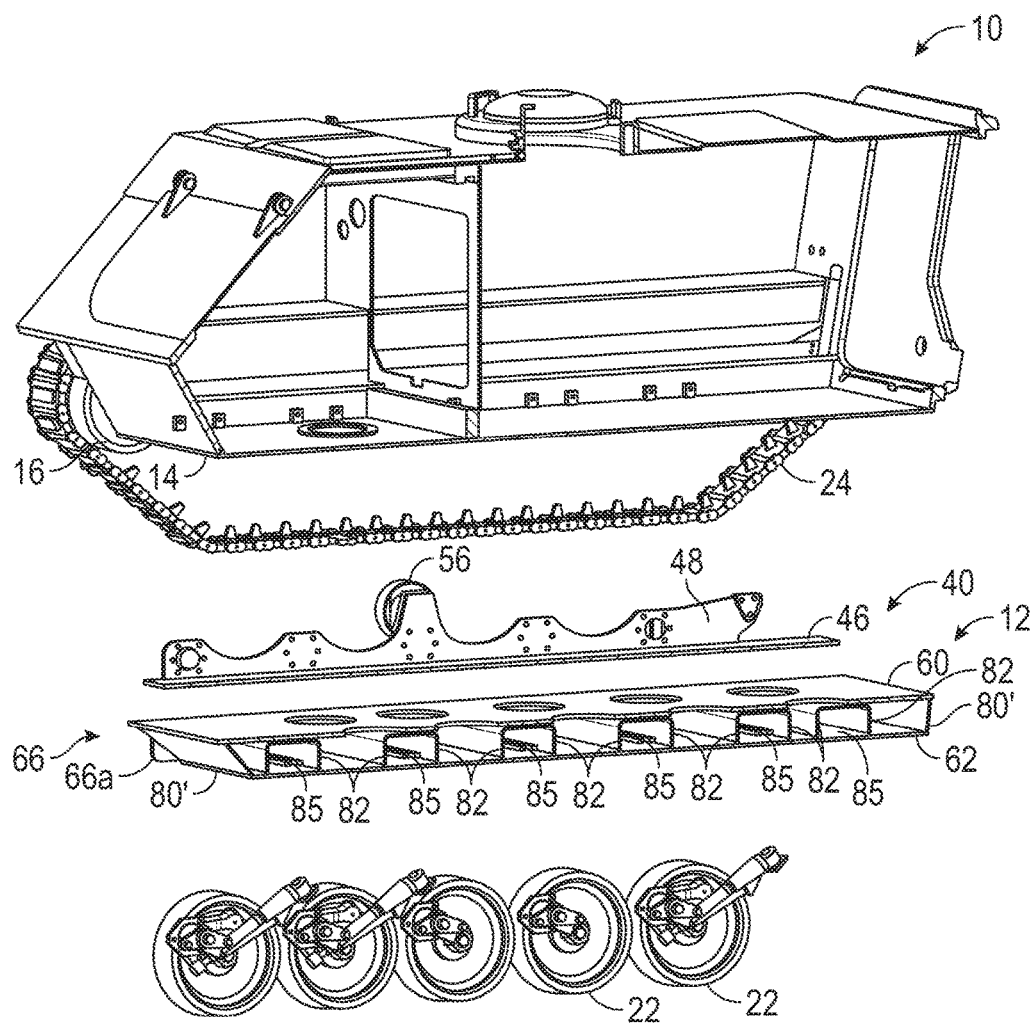
FIG. 8 is an exploded cross-sectional view of the vehicle of FIG. 1, taken along line 8-8 of FIG. 1.

The plurality of interconnecting members 64 couple the belly protection plate 62 to the top protection plate 60. Generally, the top protection plate 60 is spaced apart from the belly protection plate 62 by the plurality of interconnecting members 64. In one example, the plurality of interconnecting members 64 includes a sub-plurality of frame members 80 and a sub-plurality of energy absorbing members 82 (FIG. 8). The sub-plurality of frame members 80 defines an exterior interconnecting structure between the top protection plate 60 and the belly protection plate 62. The sub-plurality of frame members 80 includes a pair of end plates 80' and a pair of side plates 80". The end plates 80' are coupled to the top protection plate 60 and the belly protection plate 62, via welding, adhesives, mechanical fasteners, etc., at respective one of a first, front end 12a and a second, rear end 12b of the underbody blast structure 12. Each of the side plates 80" are coupled to the top protection plate 60 and the belly protection plate 62, via welding, adhesives, mechanical fasteners, etc., along a respective one of a first side 12c and a second side 12d of the underbody blast structure 12. Thus, the sub-plurality of frame members 80 interconnect a perimeter of the top protection plate 60 with a perimeter of the belly protection plate 62. Given the difference in widths between the top protection plate 60 and the belly protection plate 62, the sub-plurality of frame members 80 generally extend at an angle relative to the longitudinal axis L. Generally, each of the side plates 80" define a respective plurality of apertures 81a, 81b therethrough, and each one of the plurality of apertures 81a, 81b are coupled to a respective one of the plurality of abutments 66a, 66b to enable a portion of the suspension system 20 to pass between the top protection plate 60 and the belly protection plate 62. In one example, the plurality of apertures 81a of a first one of the side plates 80" is offset from the plurality of apertures 81a of a second one of the side plates 80" to correspond to an offset of the first plurality of abutments 66a from the second plurality of abutments 66b. Each of the plurality of apertures 81a, 81b is coupled to and in communication with a respective one of a plurality of channels 85 (FIG. 8) such that one or more of the plurality of channels 85 and the plurality of apertures 81a, 81b receive a portion of the suspension system 20 to enable the portion of the suspension system 20 to pass therethrough.

With reference to FIG. 8, the sub-plurality of energy absorbing members 82 are shown in greater detail. Generally, each energy absorbing member 82 is coupled between the top protection plate 60 and the belly protection plate 62 between adjacent portions of the suspension system 20 to define the plurality of channels 85. Thus, the plurality of energy absorbing members 82 interconnect or couple the top protection plate 60 with the belly protection plate 62. The energy absorbing members 82 span the distance defined between the top protection plate 60 and the belly protection plate 62 and are crushable to absorb energy during an impact or explosion event. Generally, the energy absorbing members 82 comprise any suitable energy absorbing member 82 that is crushable or deformable to absorb energy during an impact or explosion event. In this example, each of the plurality of channels 85 are defined to extend between the first side 42a of the housing 42 and the second side 42b of the housing 42 along an axis that is substantially transverse or oblique to the longitudinal axis L (FIG. 3). Thus, the sub-plurality of energy absorbing members 82 of the plurality of interconnecting members 64 define the plurality of channels 85 between the top protection plate 60 and the belly protection plate 62, and one or more of the plurality of channels 85 receive a portion of the suspension system 20 therethrough. In this example, as there are five road wheels 22 for each side 14, 16 of the vehicle 10, five of the plurality of channels 85 receive a portion of the suspension system 20 therethrough. It should be understood that the number of the plurality of channels 85 that receive the portion of the suspension system 20 therethrough depends on the number of pairs of road wheels associated with a particular vehicle.

With reference back to FIG. 7, each of the plurality of abutments 66a, 66b are coupled to the respective one of the side plates 80". Generally, with brief reference to FIGS. 11 and 12, the first plurality of abutments 66a is coupled to a first one of the side plates 80" such that a passage 67 defined through each of the first plurality of abutments 66a is in communication with the plurality of apertures 81a, and thus, the plurality of channels 85. The second plurality of abutments 66b is coupled to a second one of the side plates 80" such that a passage 69 defined through each of the second plurality of abutments 66b is in communication with the plurality of apertures 81b, and thus, the plurality of channels 85. Each of the plurality of abutments 66a, 66b is also coupled to the suspension system 20. In addition, a pair of the plurality of abutments 66a, 66b generally corresponds to a respective pair of the road wheels 22. In this example, the first plurality of abutments 66a that extend outwardly adjacent to the first side 62a of the belly protection plate 62 are offset from the second plurality of abutments 66b that extend outwardly adjacent to the second side 62b of the belly protection plate 62 to provide space for a portion of the suspension system 20 for each respective road wheel 22 pair.

In this example, each of the plurality of abutments 66a, 66b includes a suspension interface 90. The suspension interface 90 is configured the same as the respective mounting interface 26 such that the suspension system 20 may be coupled to the housing 42 without requiring modification of the suspension system 20. Each of the suspension interfaces 90 are illustrated herein as a plurality of mounting flanges, however, the suspension interfaces 90 may be configured in any desired way to mate with the existing suspension system 20 of the vehicle 10.

Figure 9:
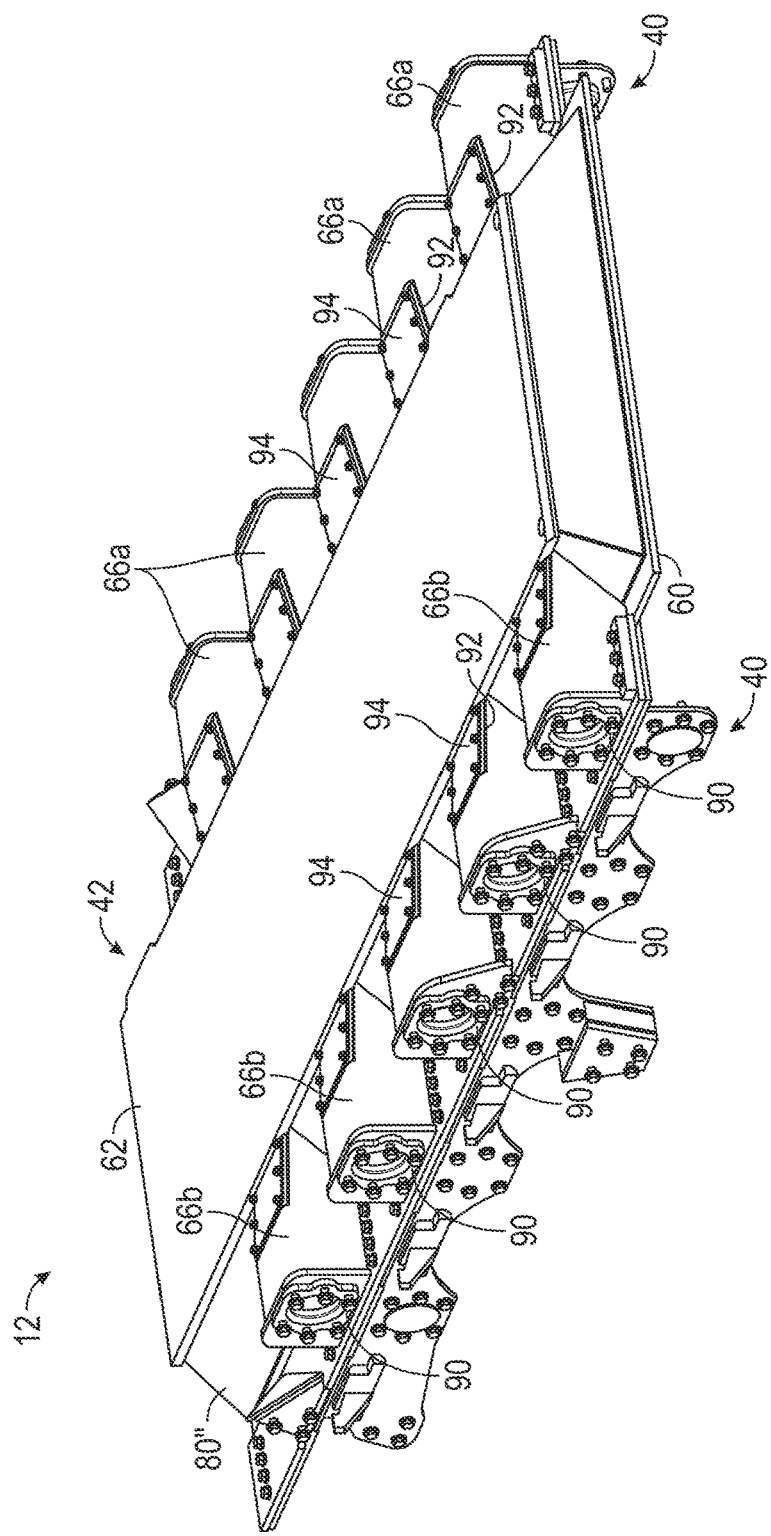
FIG. 9 is a front perspective view of an underside of the underbody blast structure of FIG. 1, which illustrates a plurality of access panel covers coupled to a plurality of access panels.

Each of the plurality of abutments 66a, 66b also includes an access panel 92. The access panel 92 provides access to a portion of the suspension system 20 to enable the installation of the suspension system 20 through the housing 42 and also enables maintenance of the suspension system 20 once installed. With reference to FIG. 9, a respective access panel cover 94 is shown coupled to each of the access panels 92. Each of the plurality of abutments 66a, 66b is in communication with a respective one of the plurality of channels 85 defined between adjacent ones of the energy absorbing members 82 to enable a portion of the suspension system 20 to pass therethrough. Thus, as will be discussed, a portion of the suspension system generally passes through one of the first plurality of abutments 66a, through a respective one of the plurality of channels 85 and passes through a corresponding one of the second plurality of abutments 66b to interconnect a respective pair of road wheels 22.

Figure 10:
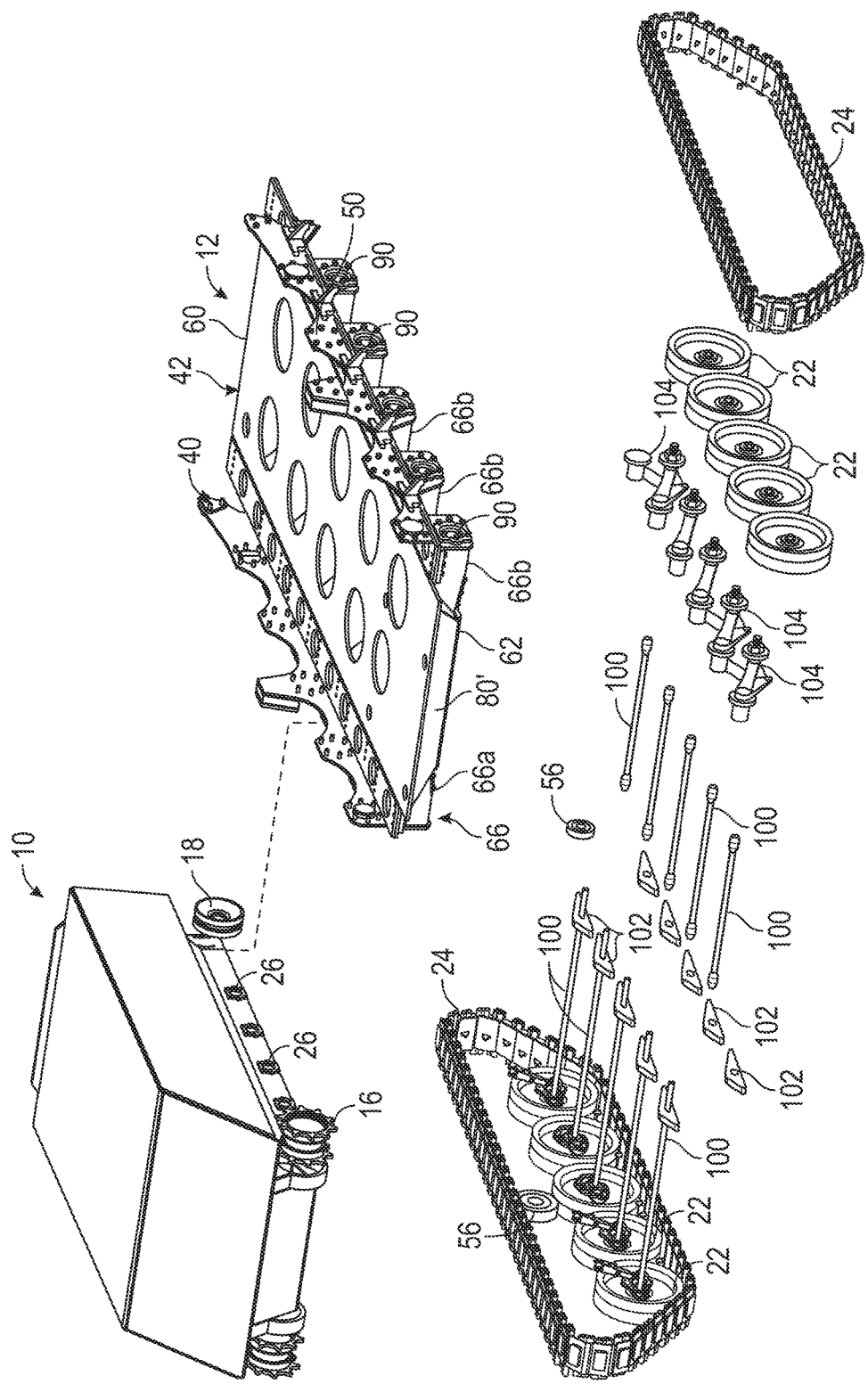
FIG. 10 is a partially exploded view of the vehicle of FIG. 1, which illustrates the underbody blast structure and a suspension system exploded from the vehicle.

With reference to FIG. 10, the suspension system 20 is shown in greater detail. In this example, the suspension system 20 includes a plurality of torsion bars 100 that are each coupled to and pass through a respective one of a plurality of brackets 102. One of the plurality of brackets 102 is received within each of the plurality of abutments 66a, 66b. The suspension system 20 also includes a plurality of mounting arms 104. Generally, each one of the road wheels 22 is coupled to a respective one of the plurality of mounting arms 104, and a respective one of the plurality of torsion bars 100 is coupled to a respective one of the plurality of mounting arms 104. Each of the plurality of torsion bars 100 are received through a respective pair of the plurality of abutments 66a, 66b, and a respective one of the plurality of mounting arms 104 is coupled to the suspension interface 90 of the respective one of the plurality of abutments 66a, 66b. A respective one of the plurality of brackets 102 is coupled to an interior surface of each of the plurality of abutments 66a, 66b so as to be accessible via the access panel 92.

Figure 11:
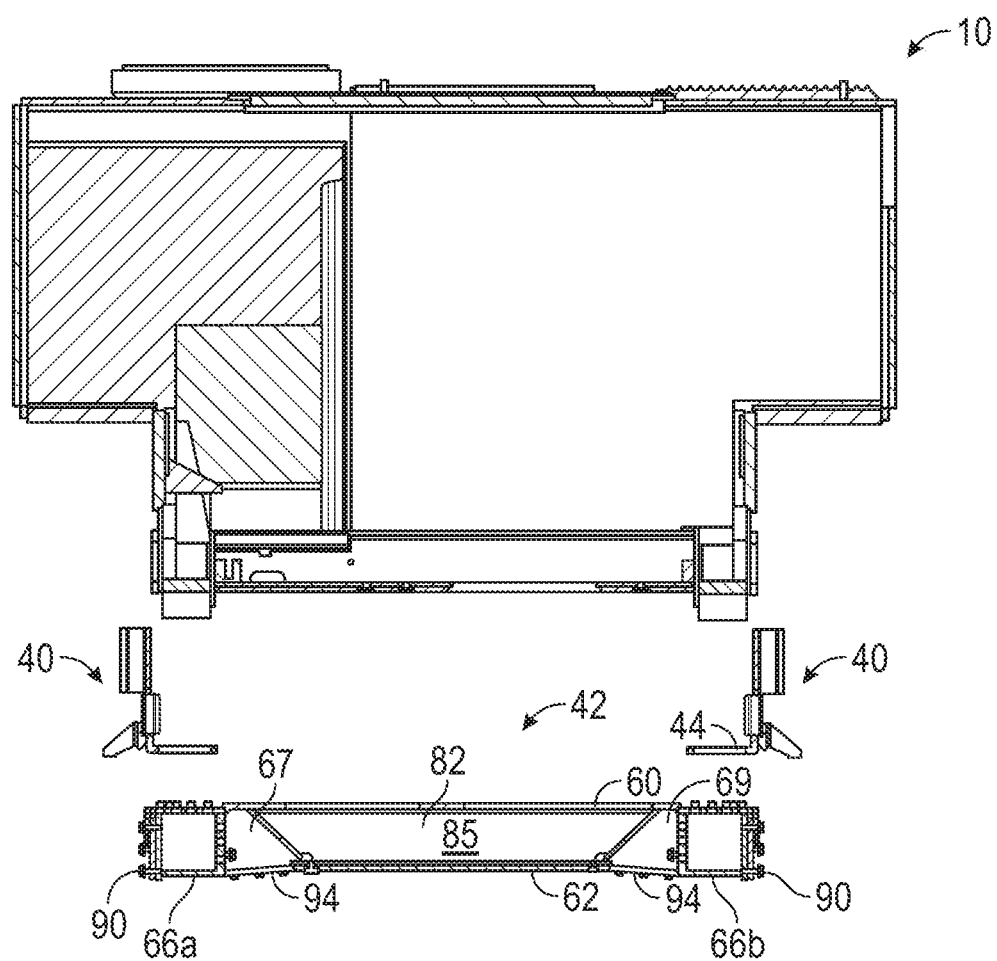
FIG. 11 is a schematic cross-sectional view of the vehicle of FIG. 1, with the underbody blast structure exploded from the vehicle and the suspension system of the vehicle removed, with the cross-section taken along line 11-11 of FIG. 1.
Figure 12:
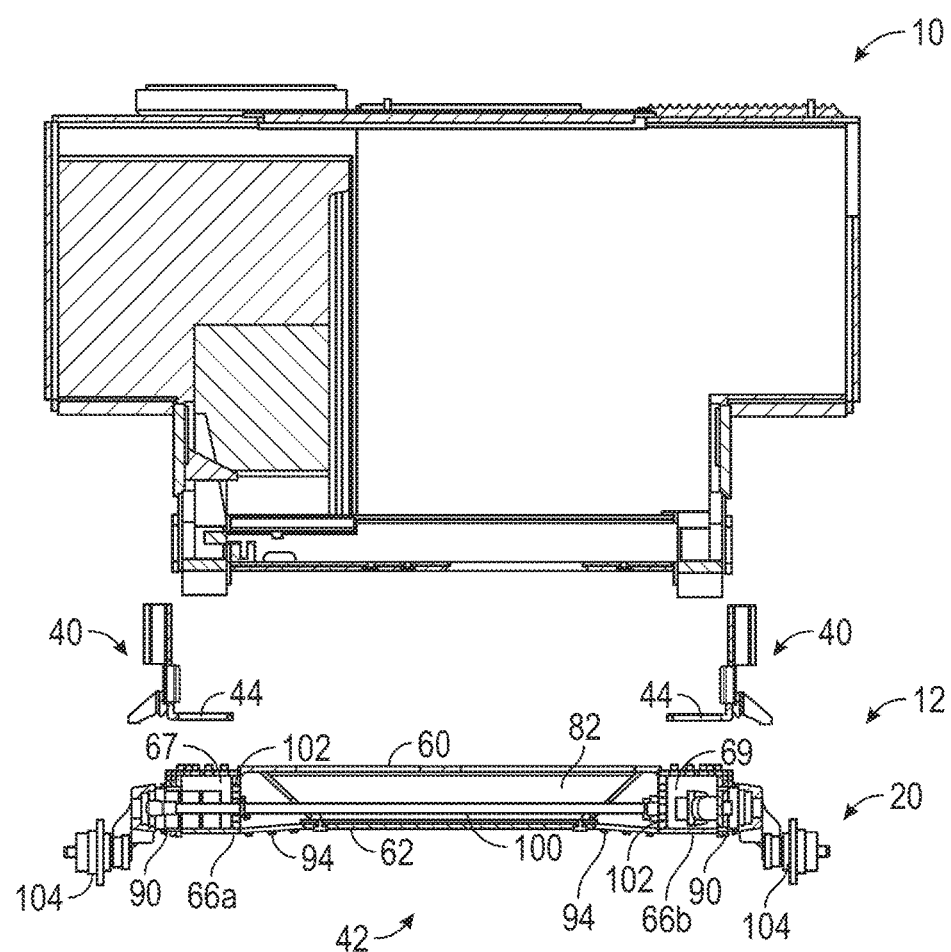
FIG. 12 is a schematic cross-sectional view of the vehicle of FIG. 1, with the underbody blast structure exploded from the vehicle and the suspension system of the vehicle coupled to the underbody blast structure, with the cross-section taken along line 11-11 of FIG. 1.
Figure 13:
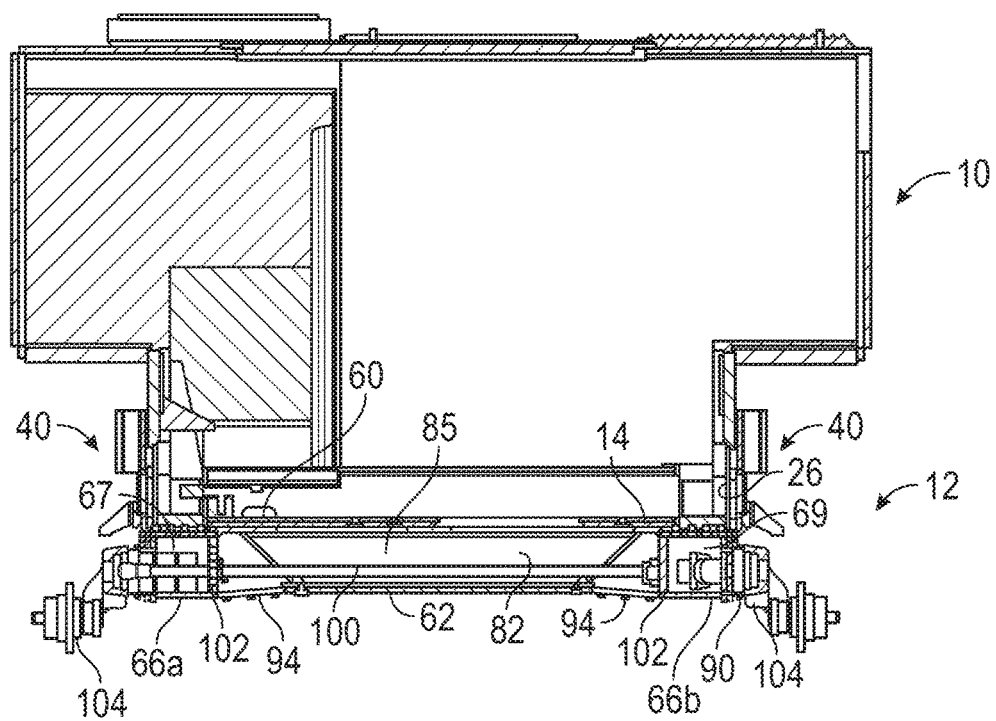
FIG. 13 is a cross-sectional view of the vehicle of FIG. 1, with the underbody blast structure coupled to the vehicle and the suspension system of the vehicle coupled to the underbody blast structure, with the cross-section taken along line 11-11 of FIG. 1.

With reference to FIG. 11, a cross-sectional view illustrates the housing 42 prior to coupling the respective torsion bar 100 and the respective mounting arm 104 to the housing 42. With reference to FIG. 12, FIG. 12 is a cross-sectional view that illustrates the suspension system 20 coupled to the housing 42. As shown in FIG. 12, the torsion bar 100 passes through one of the brackets 102 so as to be fixedly coupled to the road wheel 22 (FIG. 10) adjacent to the bracket 102 through which the torsion bar 100 passes, and the torsion bar 100 is fixedly coupled to the opposite bracket 102. With reference to FIG. 13, FIG. 13 is a cross-sectional view that illustrates a final assembly of the underbody blast structure 12 coupled to the vehicle 10, with the respective road wheels 22 and continuous track 24 removed for clarity.

With reference to FIGS. 14-22, a method of coupling the underbody blast structure 12 to a legacy vehicle, such as the vehicle 10, is shown. In the following method, the underbody blast structure 12 is retrofit to this legacy vehicle. Generally, prior to coupling the underbody blast structure 12 to the vehicle 10, each of the hangers 40 are formed, and the housing 42 is assembled. In one example, with the top protection plate 60, the belly protection plate 62, the end plates 80', the side plates 80" and the plurality of energy absorbing members 82 formed, the plurality of energy absorbing members 82 are coupled to the belly protection plate 62. The plurality of energy absorbing members 82 are also coupled to the top protection plate 60 to define the plurality of channels 85 between the top protection plate 60 and the belly protection plate 62. The end plates 80' and the side plates 80" are coupled to the belly protection plate 62 and the top protection plate 60 to couple the perimeter of the top protection plate 60 to the belly protection plate 62 and substantially enclose a space defined between the top protection plate 60 and the belly protection plate 62. With the first lip plate 68, the second lip plate 70, the first plurality of abutments 66a and the second plurality of abutments 66b formed, the first lip plate 68 is coupled to the first side 60a of the top protection plate 60, and the second lip plate 70 is coupled to the second side 60b of the top protection plate 60. Each of the first plurality of abutments 66a is coupled to one of the side plates 80" such that the first plurality of apertures 81a are each in communication with the passage 67 defined in a respective one of the first plurality of abutments 66a. Each of the second plurality of abutments 66b is coupled to one of the side plates 80" such that the second plurality of apertures 81b are each in communication with the passage 69 defined in a respective one of the second plurality of abutments 66b. As each of the plurality of apertures 81a, 81b is in communication with one of the plurality of channels 85, the passage 67 of one of the first plurality of abutments 66a is in communication with the passage 69 of one of the second plurality of abutments 66b. The access panel covers 94 may be coupled to each of the access panels 92 during the formation of each of the plurality of abutments 66a, 66b.

With the underbody blast structure 12 assembled, the underbody blast structure 12 is coupled to the vehicle 10.

Figure 14:
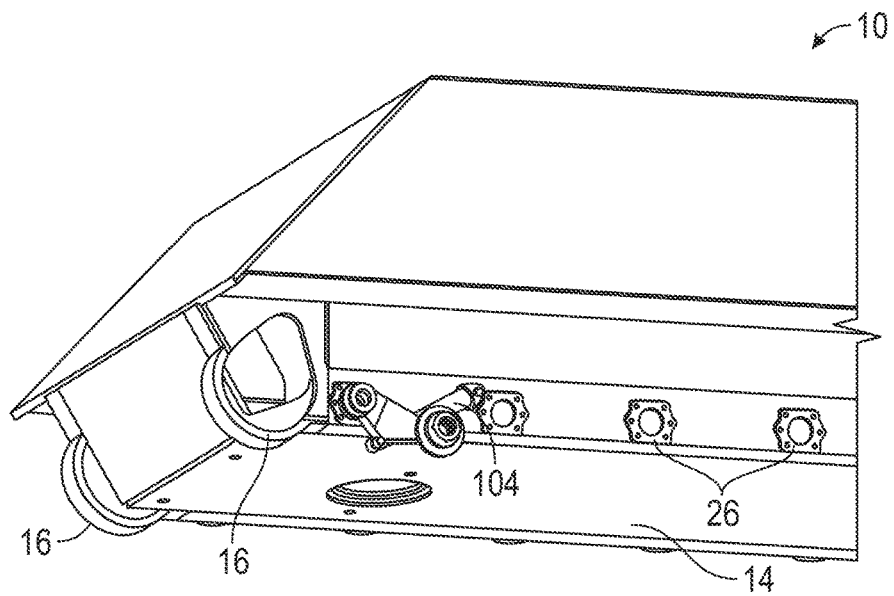
FIG. 14 is a partial view of the vehicle of FIG. 1, which illustrates a first action for coupling of the underbody blast structure to the vehicle in accordance with various embodiments in which portions of the suspension system of the vehicle are removed.
Figure 15:
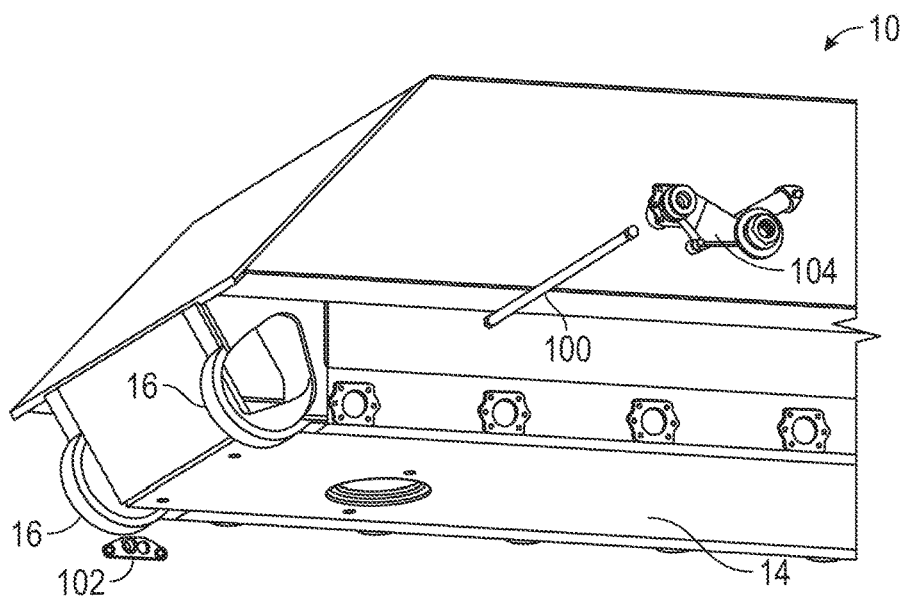
FIG. 15 is a partial view of the vehicle of FIG. 1, which illustrates a second action for coupling of the underbody blast structure to the vehicle in accordance with various embodiments in which a remainder of the suspension system is removed.
Figure 16:
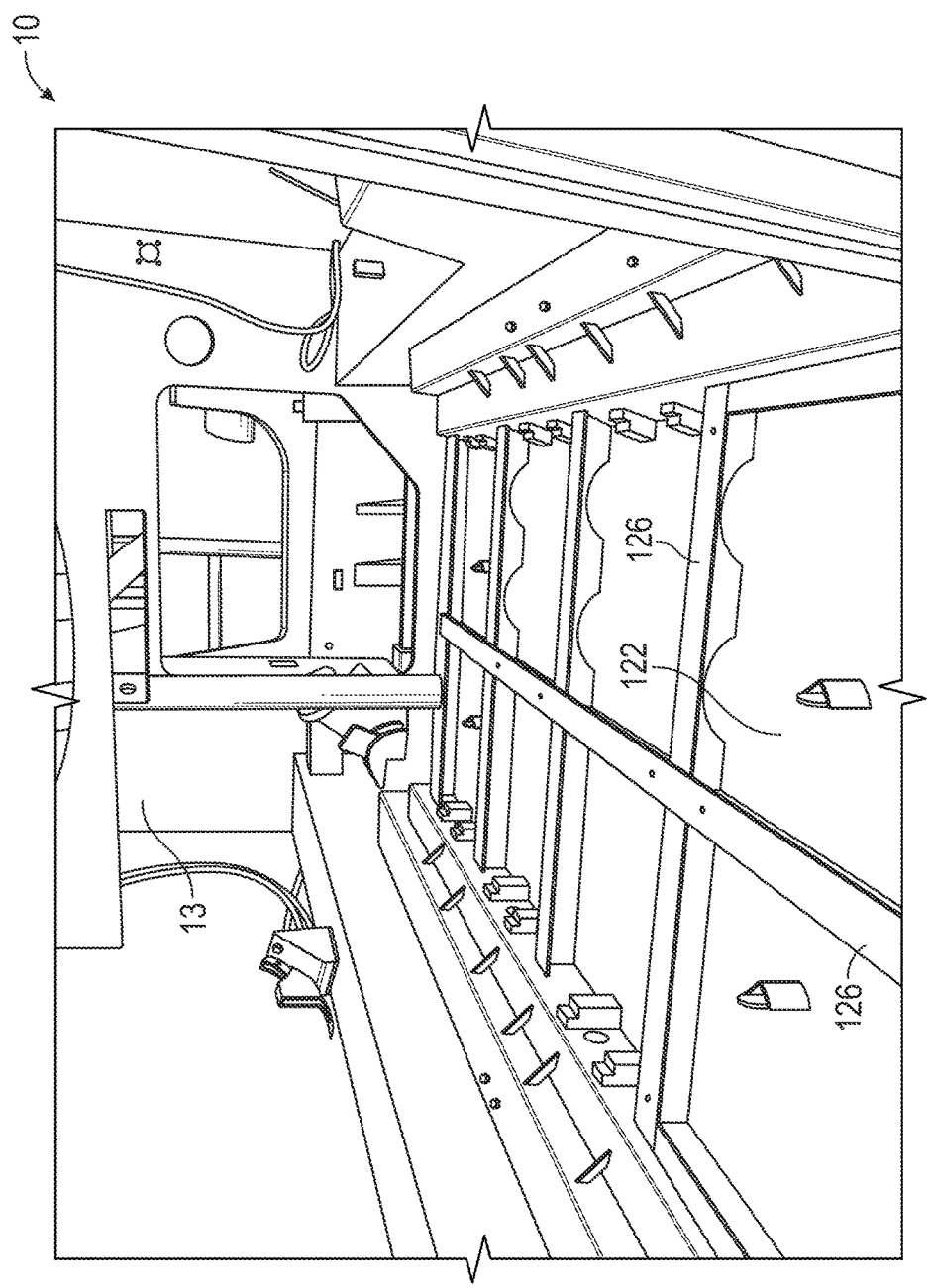
FIG. 16 is a partial view of a cabin of the vehicle of FIG. 1, which illustrates a third action for coupling of the underbody blast structure to the vehicle in accordance with various embodiments in which a subfloor of a cabin of the vehicle is removed.
Figure 17:
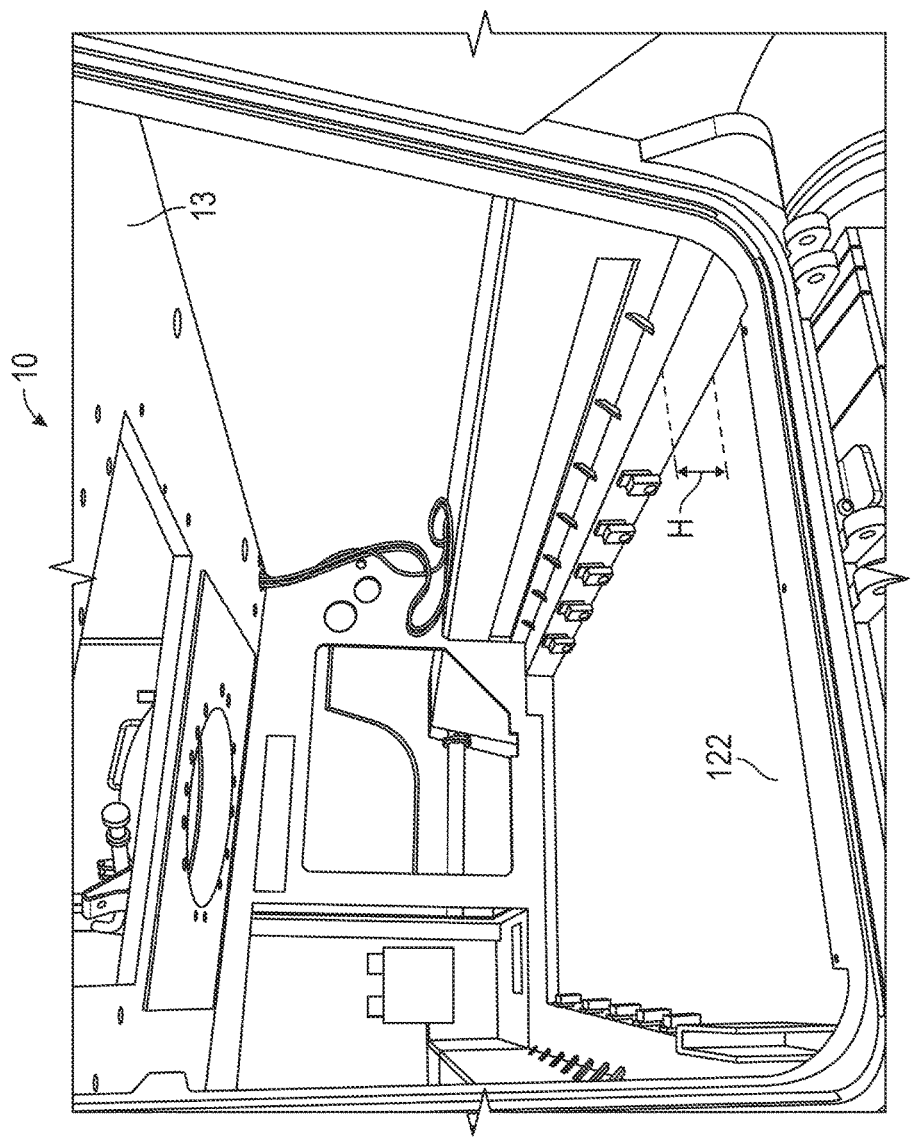
FIG. 17 is a partial view of a cabin of the vehicle of FIG. 1, which illustrates a fourth action for coupling of the underbody blast structure to the vehicle in accordance with various embodiments in which a support structure under the subfloor of the cabin is removed such that a lowest level of the vehicle is exposed.

Referring to FIG. 14, the vehicle 10 is partially shown. In this view, the vehicle 10 has been prepared for the assembly of the underbody blast structure 12 by the removal of the road wheels 22 and the continuous track 24. With reference to FIG. 15, the remaining portion of the suspension system 20 is removed, leaving the vehicle 10 with the wheels 16, 18 and the plurality of mounting interfaces 26. With reference to FIG. 16, an interior 120 of the cabin 13 is prepared for the underbody blast structure 12, by removing a subfloor to expose a lowest level 122 of the cabin 13, with the lowest level 122 being opposite the underbody 14 (FIG. 15). With reference to FIGS. 16 and 17, a support structure 126 existing between the removed subfloor and the lowest level 122 is removed, thereby exposing substantially an entirety of the lowest level 122 (FIG. 17). The exposure of the entirety of the lowest level 122 results in an increase of a cabin height H by the amount occupied by the subfloor and support structure 126. The increased cabin height H increases the volume in the cabin 13, which provides improved comfort for the occupants and enables additional energy absorbing measures to be positioned within the cabin 13, such as energy absorbing seats.

Figure 18:
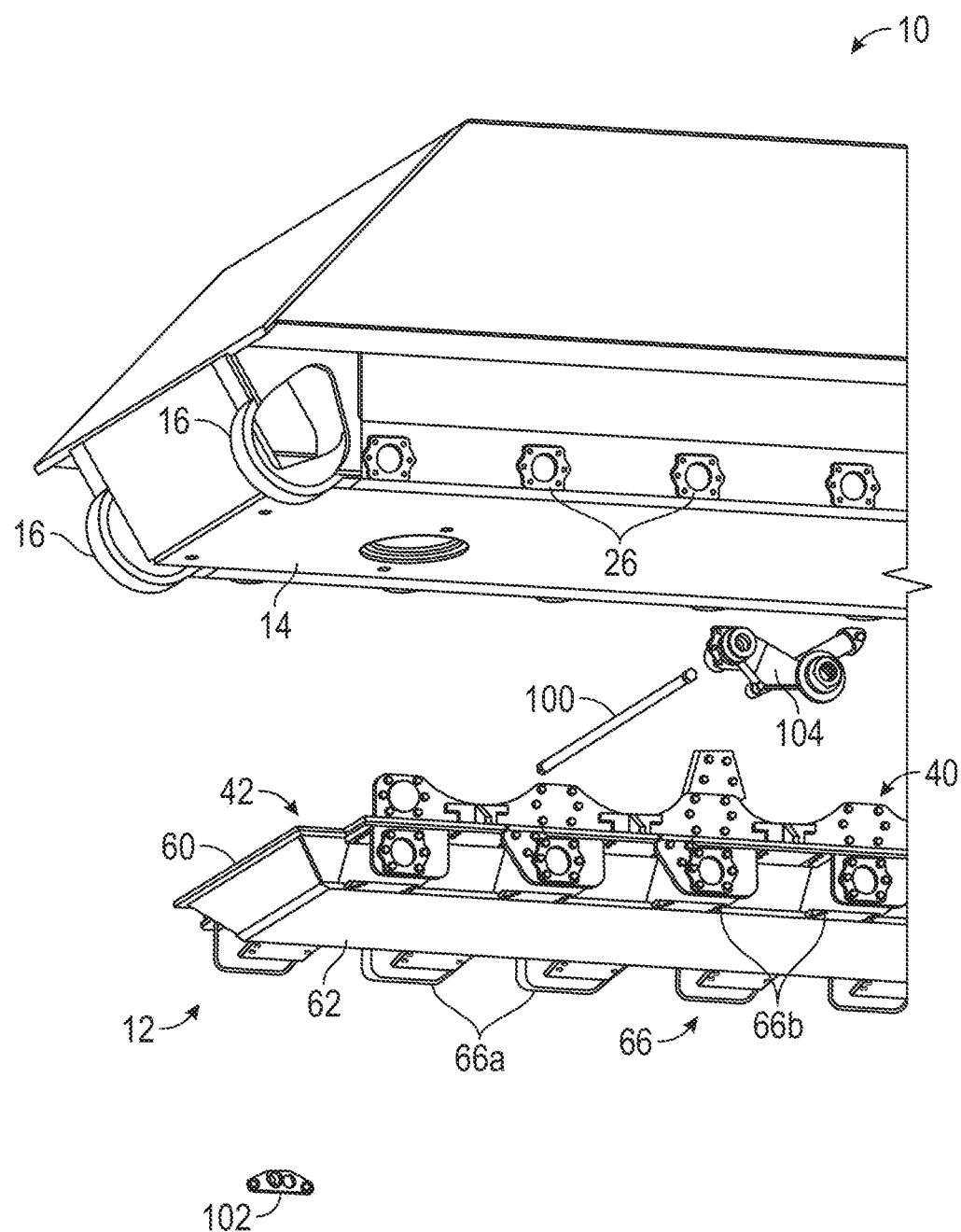
FIG. 18 is a partial view of the vehicle of FIG. 1, which illustrates a fifth action for coupling of the underbody blast structure to the vehicle in accordance with various embodiments in which a portion of the suspension system of the vehicle is coupled to the underbody blast structure.

With reference to FIG. 18, the suspension system 20 of the vehicle 10 is coupled to the underbody blast structure 12. It should be noted that while FIG. 18 illustrates the hangers 40 coupled to the housing 42, the hangers 40 may be coupled to the vehicle 10 prior to being coupled to the housing 42, as shown in FIG. 19.

Figure 19:
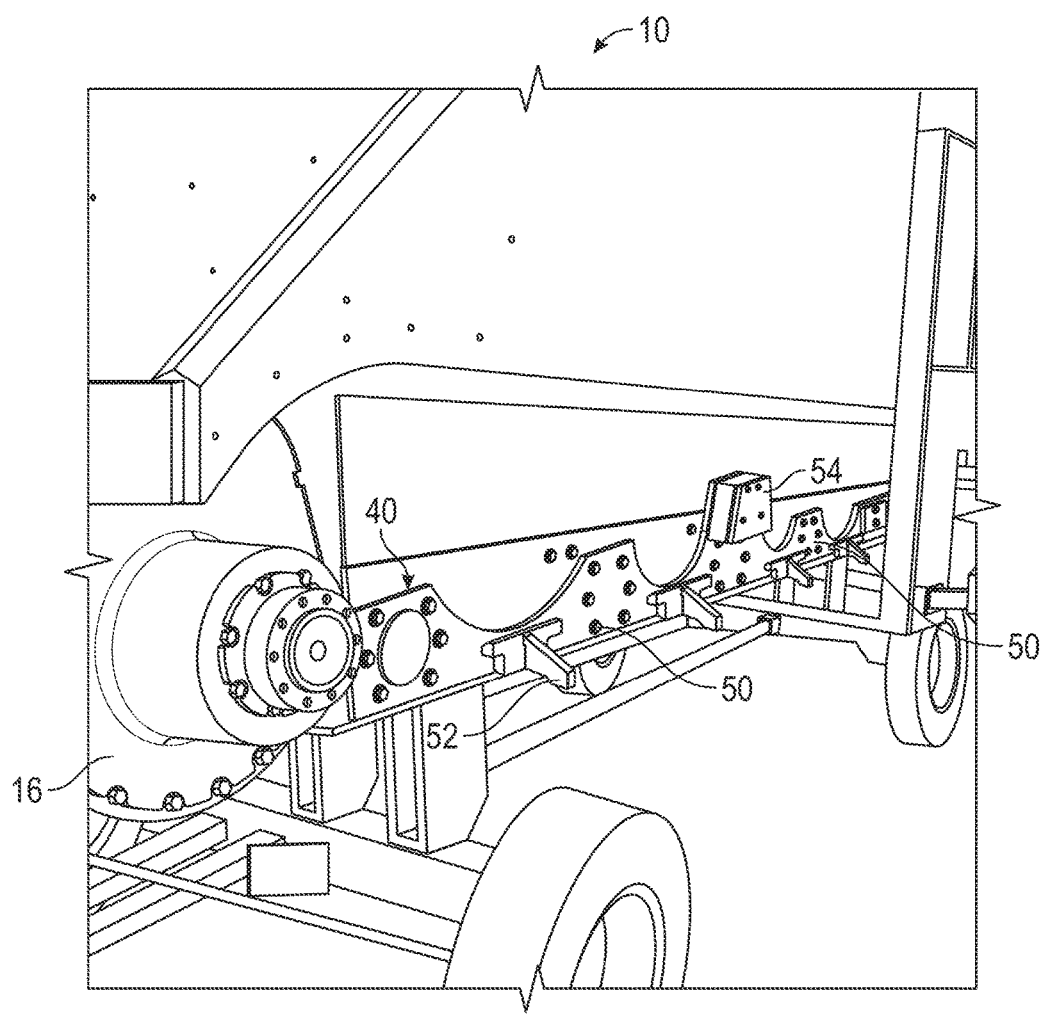
FIG. 19 is a partial view of the vehicle of FIG. 1, which illustrates a sixth action for coupling of the underbody blast structure to the vehicle in accordance with various embodiments in which the hangers are coupled to the vehicle.
Figure 20:
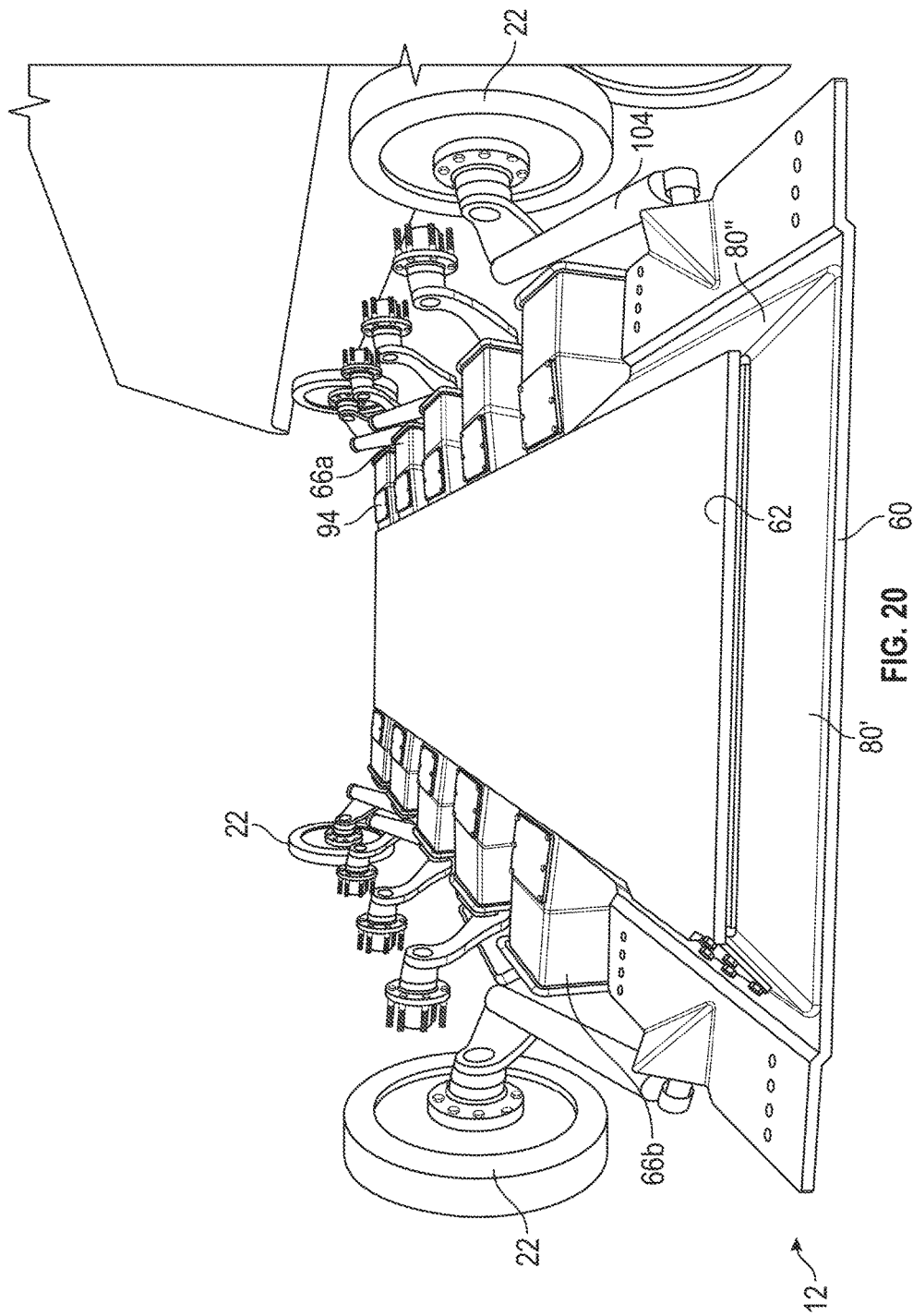
FIG. 20 is a partial view of the underbody blast structure of FIG. 1, which illustrates a seventh action for coupling of the underbody blast structure to the vehicle in accordance with various embodiments in which the suspension system of the vehicle is coupled to the underbody blast structure.

With reference to FIG. 19, the hangers 40 are coupled to the vehicle 10, such that each one of the plurality of coupling interfaces 50 are coupled to a respective one of the plurality of mounting interfaces 26. With reference to FIG. 20, the suspension system 20 of the vehicle 10 is coupled to the underbody blast structure 12, such that each one of the plurality of abutments 66a, 66b is coupled to a respective one of the mounting arms 104, and the respective one of the mounting arms 104 is coupled to a respective road wheel 22. The torsion bars 100 are coupled to each of the mounting arms 104 (FIG. 12), and the respective one of the brackets 102 (FIG. 12).

Figure 21:
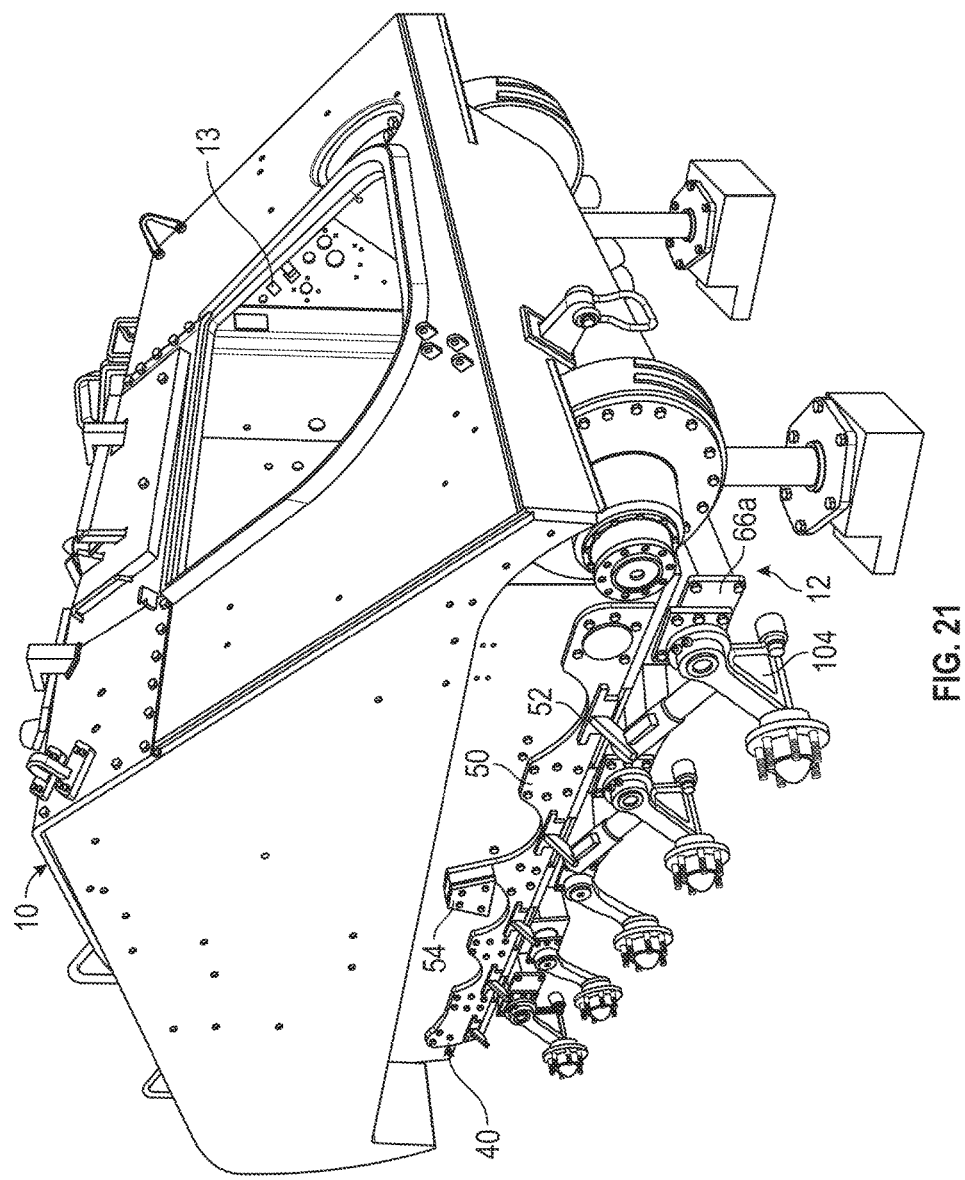
FIG. 21 is a partial view of the vehicle of FIG. 1, which illustrates an eighth action for coupling of the underbody blast structure to the vehicle in accordance with various embodiments in which the underbody blast structure, including the suspension system of the vehicle, is coupled to the hangers.
Figure 22:
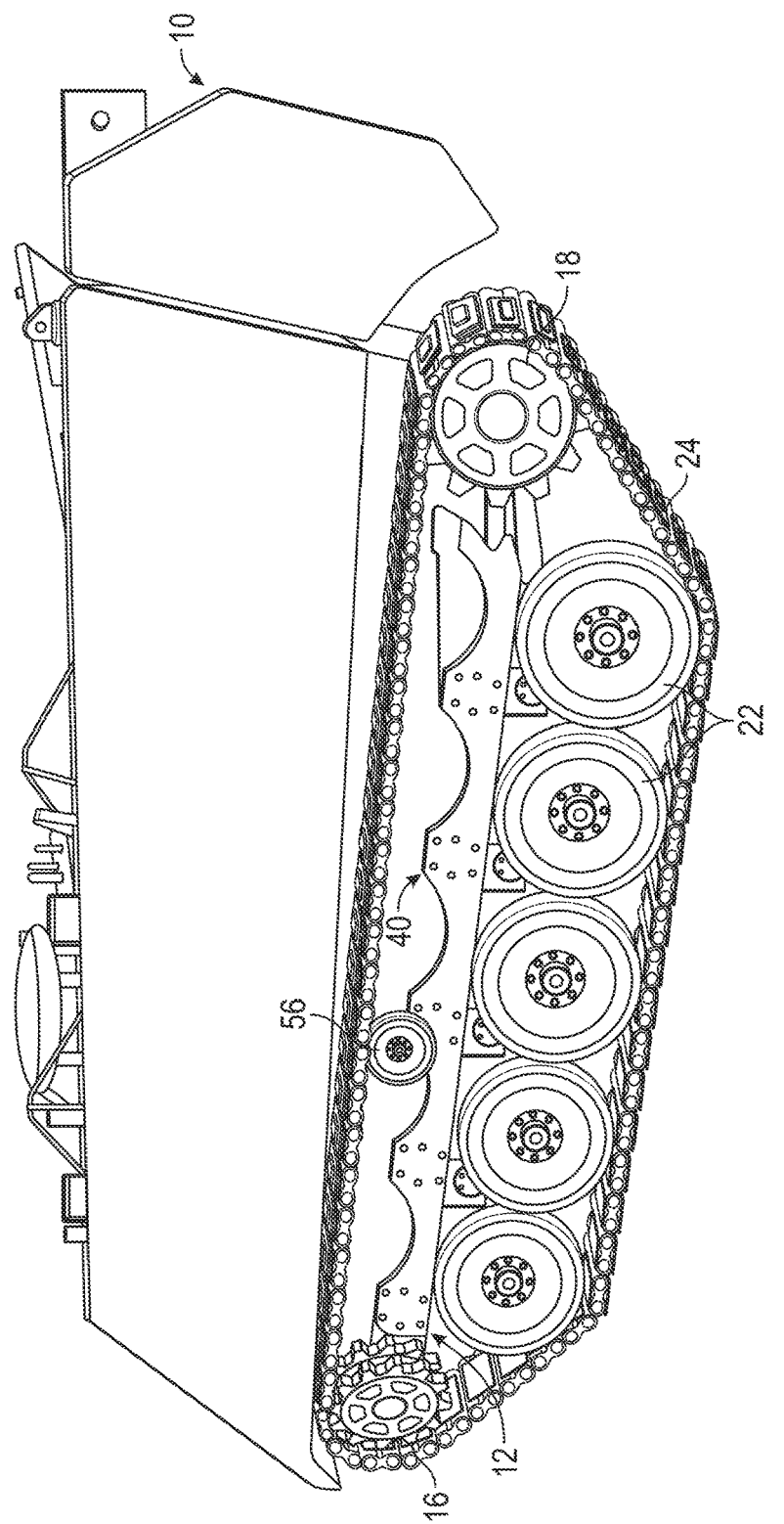
FIG. 22 is a perspective view of the vehicle of FIG. 1, which illustrates a ninth action for coupling of the underbody blast structure to the vehicle in accordance with various embodiments in which the continuous track is coupled about driving wheels, a return wheel and road wheels of the vehicle with the underbody blast structure coupled to the vehicle.

With reference to FIG. 21, with the hangers 40 coupled to the vehicle 10, and the suspension system 20, including the road wheels 22, coupled to the housing 42, the housing 42 is coupled to the hangers 40. In FIG. 21, the wheels 16, 18 and road wheels 22 are removed for clarity. Referring to FIG. 22, with the wheels 16, 18 coupled to the vehicle 10 and the road wheels 22 coupled to the suspension system 20, the return roller 56 is coupled to the hangers 40 and the continuous track 24 is coupled about the wheels 16, 18, the return roller 56 and the road wheels 22. Throughout the coupling of the underbody blast structure 12 to the vehicle 10, the mounting interfaces 26 of the vehicle 10 do not need to be modified. This enables the underbody blast structure 12 to be coupled to existing, legacy vehicles such as the vehicle 10 without complex tools and expensive modifications to an existing vehicular structure.

Figure 23:
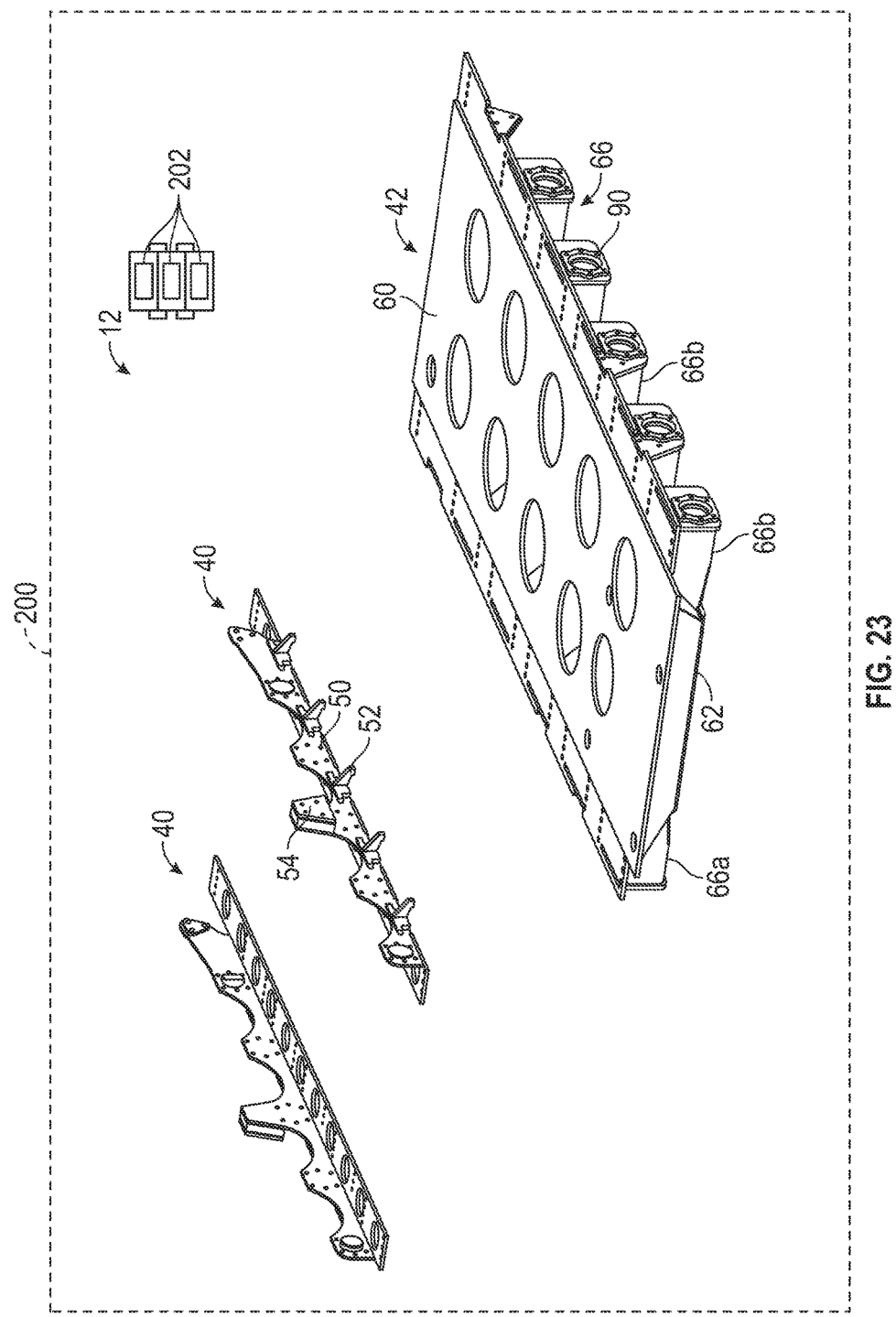
FIG. 23 is a perspective view of a kit for an underbody blast system for a vehicle in accordance with various embodiments.

In certain embodiments, with reference to FIG. 23, the hangers 40 and the housing 42 are provided as an underbody blast kit 200. The underbody blast kit 200 may also include additional track 202 for situations in which the continuous track 24 may need to be lengthened to surround the drive wheels, the suspension system and the return roller associated with the vehicle.

Figure 24:
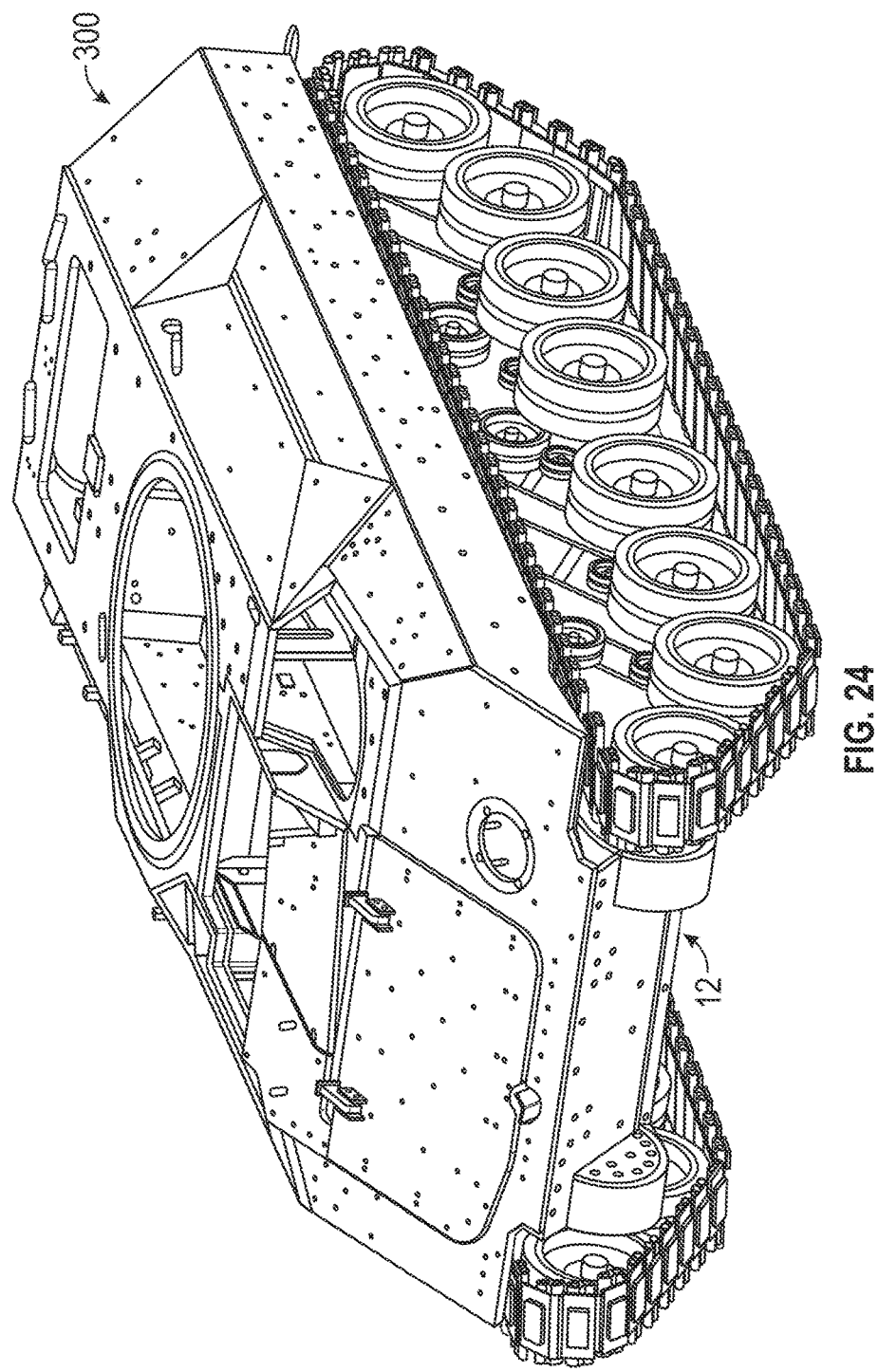
FIG. 24 is a perspective view of another motor vehicle including the underbody blast structure in accordance with the various teachings of the present disclosure.
Figure 25:
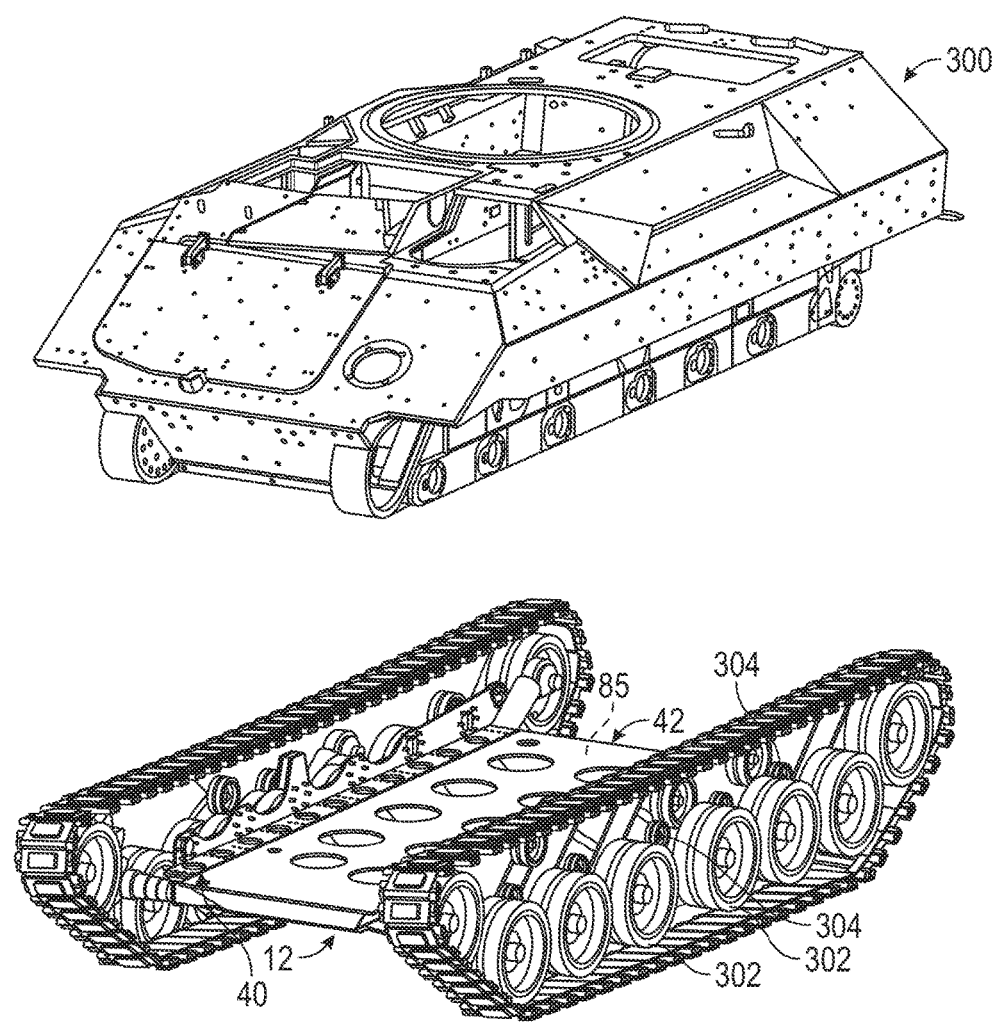
FIG. 25 is a partially exploded view of the vehicle of FIG. 24.

It should be noted that the various teachings of the present application are not limited to the vehicle 10 illustrated herein in FIGS. 1-22. In this regard, with reference to FIGS. 24 and 25, a vehicle 300 is shown. The vehicle 300 has been retrofit with the underbody blast structure 12 as discussed herein with regard to FIGS. 1-22. As shown, the vehicle 300 has more road wheels 302 than the vehicle 10, and thus, a greater number of the plurality of channels 85 receive a portion of the suspension system 304 associated with the vehicle 300.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An underbody blast structure, comprising:
   a first hanger adapted to couple to a vehicle; and
   a housing coupled to the first hanger, the housing including a first protection plate opposite a second protection plate, the first protection plate and the second protection plate are adapted to protect the vehicle, the first protection plate spaced apart from the second protection plate by a plurality of interconnecting members, the plurality of interconnecting members defining a plurality of channels between the first protection plate and the second protection plate, at least one of the plurality of channels adapted to receive a portion of a suspension system of the vehicle, the first protection plate including a first lip plate on a first side and a second lip plate on a second side and the first hanger is coupled to the first lip plate such that the first hanger and the first protection plate cooperate to define a uniform surface adapted to receive the vehicle.

2. The underbody blast structure of claim 1, further comprising a second hanger coupled to the second side of the first protection plate.

3. The underbody blast structure of claim 2, wherein the second hanger is coupled to the second lip plate such that the first hanger, the second hanger and the first protection plate cooperate to define the uniform surface adapted to receive the vehicle.

4. The underbody blast structure of claim 1, wherein the first hanger includes a first hanger side substantially perpendicular to a second hanger side, and the first hanger side is coupled to the first protection plate and the second hanger side is adapted to be coupled to the vehicle.

5. The underbody blast structure of claim 4, wherein the second hanger side includes a plurality of coupling interfaces that are each spaced apart along a longitudinal axis of the underbody blast structure and are adapted to be coupled to a mounting interface of the vehicle.

6. The underbody blast structure of claim 1, wherein the plurality of interconnecting members includes a sub-plurality of frame members that interconnect a perimeter of the first protection plate with a perimeter of the second protection plate and a sub-plurality of energy absorbing members that extend from a first side of the housing to a second side of the housing and couple the first protection plate to the second protection plate to define the plurality of channels.

7. The underbody blast structure of claim 6, wherein the plurality of interconnecting members includes a first side plate and a second side plate, the first side plate defining a first plurality of apertures and the second side plate defining a second plurality of apertures, and the at least one of the plurality of channels is in communication with a respective one of the first plurality of apertures and a respective one of the second plurality of apertures to receive the portion of the suspension system.

8. The underbody blast structure of claim 7, further comprising a plurality of abutments, with a sub-plurality of the plurality of abutments coupled to each of the first plurality of apertures and a second sub-plurality of the plurality of abutments coupled to each of the second plurality of apertures, and each of the plurality of abutments includes a suspension mounting interface adapted to couple the portion of the suspension system to the housing.

9. A kit for coupling to a vehicle to provide underbody blast protection, the kit comprising:
  a housing including a first protection plate opposite a second protection plate, the first protection plate spaced apart from the second protection plate by a plurality of interconnecting members, the plurality of interconnecting members defining a plurality of channels between the first protection plate and the second protection plate, at least one of the plurality of channels adapted to receive a portion of a suspension system of the vehicle; and
  at least one hanger coupled to the first protection plate and the at least one hanger couples the housing to the vehicle,
  wherein the first protection plate includes a first lip plate on a first side and a second lip plate on a second side, and the at least one hanger includes a first hanger and a second hanger, the first hanger is coupled to the first lip plate and the second hanger is coupled to the second lip plate such that the first hanger, the second hanger and the first protection plate cooperate to define a uniform surface adapted to receive the vehicle.

10. The kit of claim 9, wherein the first hanger includes a first hanger side substantially perpendicular to a second hanger side, and the first hanger side is coupled to the first protection plate and the second hanger side includes a plurality of coupling interfaces that are each spaced apart along a longitudinal axis of the underbody blast structure and are each adapted to be coupled to a mounting interface of the vehicle.

11. The kit of claim 9, wherein the plurality of interconnecting members includes a sub-plurality of frame members that interconnect a perimeter of the first protection plate with a perimeter of the second protection plate and a sub-plurality of energy absorbing members that extend from a first side of the housing to a second side of the housing and couple the first protection plate to the second protection plate to define the plurality of channels.

12. The kit of claim 11, wherein the plurality of interconnecting members includes a first side plate and a second side plate, the first side plate defining a first plurality of apertures and the second side plate defining a second plurality of apertures, and the at least one of the plurality of channels is in communication with a respective one of the first plurality of apertures and a respective one of the second plurality of apertures to receive the portion of the suspension system.

13. The kit of claim 12, further comprising a first plurality of abutments and a second plurality of abutments, with each of the first plurality of abutments coupled to each of the first plurality of apertures and each of the second plurality of abutments coupled to each of the second plurality of apertures, and each of the plurality of abutments includes a suspension mounting interface adapted to couple the portion of the suspension system to the housing.

14. A vehicle, comprising:
  a body defining a first plurality of body mounting interfaces on a first side and a second plurality of body mounting interfaces on a second side, the body having an underbody between the first side and the second side;
  a suspension system coupled to a plurality of road wheels; and
  an underbody blast structure coupled adjacent to the underbody the vehicle, the underbody blast structure including:
    a first hanger having a first plurality of coupling interfaces that cooperate with the first plurality of body mounting interfaces to couple the first hanger to the first side of the body;
    a second hanger having a second plurality of coupling interfaces that cooperate with the second plurality of body mounting interfaces to couple the second hanger to the second side of the body; and
    a housing coupled to the first hanger and the second hanger, the housing including a first protection plate opposite a second protection plate, a first plurality of abutments that extend from the housing along a first housing side of the housing and a second plurality of abutments that extend from the housing along a second housing side of the housing, the first protection plate spaced apart from the second protection plate by a plurality of interconnecting members, the plurality of interconnecting members defining a plurality of channels between the first protection plate and the second protection plate that extend from the first housing side to the second housing side, at least one of the plurality of channels in communication with a respective one of the first plurality of abutments and a respective one of the second plurality of abutments to receive a portion of the suspension system, with each of the first plurality of abutments and each of the second plurality of abutments coupled to a respective one of the plurality of road wheels.

15. The vehicle of claim 14, wherein the first protection plate includes a first lip plate and a second lip plate, and the first hanger is coupled to the first lip plate and the second hanger is coupled to the second lip plate such that the first hanger, the second hanger and the first protection plate cooperate to define a uniform surface adapted to receive the vehicle.

16. The vehicle of claim 14, wherein the first hanger includes a first hanger side substantially perpendicular to a second hanger side, and the first hanger side is coupled to the first protection plate and the second hanger side includes the first plurality of coupling interfaces.

17. The vehicle of claim 14, wherein the plurality of interconnecting members includes a sub-plurality of frame members that interconnect a perimeter of the first protection plate with a perimeter of the second protection plate and a sub-plurality of energy absorbing members that extend from a first side of the housing to a second side of the housing and interconnect the first protection plate with the second protection plate to define the plurality of channels.

18. The vehicle of claim 17, wherein the plurality of interconnecting members includes a first side plate and a second side plate, the first side plate defining a first plurality of apertures and the second side plate defining a second plurality of apertures, and the at least one of the plurality of channels is in communication with a respective one of the first plurality of apertures and a respective one of the second plurality of apertures to receive the portion of the suspension system, with the first plurality of abutments coupled to the first plurality of apertures and the second plurality of abutments coupled to the second plurality of apertures.

19. The vehicle of claim 14, wherein the vehicle is a continuous track vehicle, and at least the first hanger includes a return mount that couples a return roller to the first hanger.

\* \* \* \* \*